United States Patent
Cai et al.

(10) Patent No.: US 9,499,668 B2
(45) Date of Patent: Nov. 22, 2016

(54) CONTROLLED RELEASE AMINE-CATALYZED, MICHAEL ADDITION-CURABLE SULFUR-CONTAINING POLYMER COMPOSITIONS

(71) Applicant: PRC-DeSoto International, Inc., Sylmar, CA (US)

(72) Inventors: Juexiao Cai, Stevenson Ranch, CA (US); Lawrence G. Anderson, Allison Park, PA (US); Renhe Lin, Stevenson Ranch, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 0 days.

(21) Appl. No.: 14/565,482

(22) Filed: Dec. 10, 2014

(65) Prior Publication Data

US 2015/0099858 A1    Apr. 9, 2015

Related U.S. Application Data (63) Continuation of application No. 13/659,152, filed on Oct. 24, 2012, now Pat. No. 9,018,322, which is a continuation-in-part of application No. 13/529,237, filed on Jun. 21, 2012, now Pat. No. 8,871,896.

(51) Int. Cl.

| | | |
|---|---|---|
| *C08G 75/04* | (2016.01) | |
| *C08G 75/12* | (2016.01) | |
| *C08G 75/02* | (2016.01) | |
| *C09J 181/02* | (2006.01) | |
| *C08L 81/02* | (2006.01) | |

(52) U.S. Cl.
CPC .............. *C08G 75/045* (2013.01); *C08G 75/02* (2013.01); *C08G 75/12* (2013.01); *C08L 81/02* (2013.01); *C09J 181/02* (2013.01)

(58) Field of Classification Search
None
See application file for complete search history.

(56) References Cited

U.S. PATENT DOCUMENTS

| | | | |
|---|---|---|---|
| 3,138,573 A | 6/1964 | LeFave et al. | |
| 4,059,570 A | 11/1977 | Oswald | |
| 4,366,307 A | 12/1982 | Singh et al. | |
| 4,468,202 A | 8/1984 | Cohen | |
| 4,609,762 A | 9/1986 | Morris et al. | |
| 4,983,705 A * | 1/1991 | Lewis | C08G 73/124 528/170 |
| 5,225,472 A | 7/1993 | Cameron et al. | |
| 5,270,364 A | 12/1993 | Schwartz et al. | |
| 5,284,888 A | 2/1994 | Morgan | |
| 5,912,319 A * | 6/1999 | Zook | C08G 75/045 525/212 |
| 6,172,179 B1 | 1/2001 | Zook et al. | |
| 6,184,280 B1 | 2/2001 | Shibuta | |
| 6,525,168 B2 | 2/2003 | Zook et al. | |
| 6,639,046 B1 * | 10/2003 | Van Dijk | C08G 18/671 428/500 |
| 7,671,145 B2 | 3/2010 | Sawant et al. | |
| 2004/0242867 A1 * | 12/2004 | Baudin | C07D 487/04 540/594 |
| 2006/0175005 A1 * | 8/2006 | Sawant | C08L 81/02 156/307.1 |
| 2006/0270796 A1 * | 11/2006 | Sawant | C08G 75/045 525/126 |
| 2007/0173602 A1 * | 7/2007 | Brinkman | C08F 222/1006 524/592 |
| 2010/0010133 A1 | 1/2010 | Zook et al. | |
| 2010/0041839 A1 | 2/2010 | Anderson et al. | |

FOREIGN PATENT DOCUMENTS

EP    2420524 A1    2/2012

OTHER PUBLICATIONS

Chan et al., "Nucleophile-Initiated Thiol-Michael Reactions: Effect of Organocatalyst, Thiol, and Ene", *Macromolecules*, 2010, vol. 43, No. 15, p. 6381-6388.

Mather et al., "Michael addition reactions in macromolecular design for emerging technologies", *Progress in Polymer Science*, 2006, vol. 31, p. 487-531.

Mitsushiro et al., "Synthesis of Well-Defined and End-Polymerizable Star-Shaped Polysulfides and their Application to Negative Photoresist", Journal of Polymer Science: Part A: Polymer Chemistry; Oct. 15, 2010, vol. 48, Issue 20, p. 4385-4392.

* cited by examiner

*Primary Examiner* — Robert C Boyle
(74) *Attorney, Agent, or Firm* — William R. Lambert (57) ABSTRACT

Compositions comprising sulfur-containing polymers such as polythioethers, Michael acceptors, and controlled release amine catalysts employing Michael addition curing chemistries useful in aerospace sealant applications are disclosed. The compositions exhibit extended pot life and the rate of curing can be tailored for specific applications.

17 Claims, 1 Drawing Sheet

CONTROLLED RELEASE AMINE-CATALYZED, MICHAEL ADDITION-CURABLE SULFUR-CONTAINING POLYMER COMPOSITIONS

CROSS REFERENCE TO RELATED APPLICATION

This application is a continuation of U.S. application Ser. No. 13/659,152, filed on Oct. 24, 2012, which is a continuation-in-part and claims priority to U.S. patent application Ser. No. 13/529,237 filed on Jun. 21, 2012, which issued as U.S. Pat. No. 8,871,896, on Oct. 28, 2014, each of which is incorporated by reference in its entirety.

FIELD

The present disclosure relates to compositions comprising a polythioether and controlled release amine catalysts employing Michael addition curing chemistries. The compositions are useful in aerospace sealant applications where they exhibit extended pot life and provide controlled curing rates.

BACKGROUND

Sealants useful in aerospace and other applications must satisfy demanding mechanical, chemical, and environmental requirements. The sealants can be applied to a variety of surfaces including metal surfaces, primer coatings, intermediate coatings, finished coatings, and aged coatings. In sealants such as those described in U.S. Pat. No. 6,172,179 an amine catalyst is used to provide a cured product. Such systems typically cure in 2 hours to 12 hours and although exhibiting acceptable fuel resistance and thermal resistance for many applications, a longer pot life such as from 24 hours to 72 hours, and improved performance of the cured product is desirable.

Michael addition curing chemistries are often used in acrylic-based polymer systems and, as disclosed in U.S. Pat. No. 3,138,573, have been adapted for use in polysulfide compositions. Application of Michael addition curing chemistries to sulfur-containing polymers not only results in cured sealants having faster cure rates and enhanced performance including fuel resistance and thermal resistance, but also provides a sealant with improved physical properties such as elongation. The use of Michael addition curing chemistries for sulfur-containing polymer compositions useful in aerospace sealant application is disclosed in U.S. application Ser. No. 13/529,237, filed on Jun. 21, 2012, which is incorporated by reference.

The compositions disclosed in U.S. application Ser. No. 13/529,237 employed one or more base catalysts such as amine catalysts. In the presence of a strong base such as 1,8-diazabicycloundec-7-ene (DBU) or 1,4-diazabicyclo [2.2.2]octane (DABCO) or a $C_{6-10}$ primary amine, the thiol-Michael addition reaction is fast and the cure time is typically less than 2 hours. Without a strong base catalyst, such as triethylamine, the Michael addition reaction between, for example, a thiol-terminated polythioether and a Michael acceptor is slow providing a pot life, for example, depending on the temperature, of several days to weeks. However, the physical properties of the cured composition are less than desired. The reaction mechanisms for thiol-Michael addition reactions are disclosed by Chan et al., *Macromolecules* 2010, 43, 6381-6388.

In practice, the foregoing compositions can be provided as two-part compositions in which the thiol-terminated compound and the Michael acceptor are provided as separate components, with the amine catalyst in one or both components, and the two parts are mixed shortly prior to use. For example, if the catalytic amine is a tertiary amine, the amine catalyst may be in one or both components, and if the catalytic amine is a primary or secondary amine, the amine catalyst can only be included in the component containing the thiol-terminated compound. Alternatively, the base catalyst may be provided as a third component, and the component containing the thiol-terminated compound, the component containing the Michael acceptor, and the component containing the base catalyst are mixed shortly before use. However, once the components are mixed, the Michael addition reaction proceeds, and depending at least in part on the temperature and on the type of amine catalyst, the pot life is limited to less than 2 hours. Furthermore, as the composition starts to cure, there is little ability to control the reaction rate to take advantage of the complex chemistries taking place after the sealant is applied to a surface.

Ways to prolong the pot life and to control the curing rate of sulfur-containing polymer compositions employing Michael addition curing chemistries are desired.

SUMMARY

Compositions having extended pot life and controlled curing rate are realized by using a controlled release amine catalyst. In these systems, an amine catalyst such as a strong base or primary amine that produces a fast reaction rate is protected or encapsulated and dispersed in the composition. Upon exposure, for example, to ultraviolet radiation, moisture, or temperature, the catalytic amine is released and catalyzes the Michael addition reaction. In certain embodiments, systems provide a pot life greater than 2 hours to 12 hours and cure within 24 to 72 hours after the useful working time.

In a first aspect, compositions are provided comprising (a) a compound comprising at least two terminal groups reactive with Michael acceptor groups; (b) a compound having at least two Michael acceptor groups; and (c) a controlled release amine catalyst, wherein at least one of (a) and (b) comprises a polythioether polymer.

In a second aspect, method of using a composition comprising (a) a compound comprising at least two terminal groups reactive with Michael acceptor groups; (b) a compound having at least two Michael acceptor groups; and (c) a controlled release amine catalyst, wherein at least one of (a) and (b) comprises a polythioether polymer, are provided.

Reference is now made to certain embodiments of compositions and methods. The disclosed embodiments are not intended to be limiting of the claims. To the contrary, the claims are intended to cover all alternatives, modifications, and equivalents.

DETAILED DESCRIPTION

Definitions

For purposes of the following description, it is to be understood that embodiments provided by the present disclosure may assume various alternative variations and step sequences, except where expressly specified to the contrary. Moreover, other than in the examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10. Also, in this application, the use of "or" means "and/or" unless specifically stated otherwise, even though "and/or" may be explicitly used in certain instances.

A dash ("—") that is not between two letters or symbols is used to indicate a point of bonding for a substituent or between two atoms. For example, —$CONH_2$ is bonded to another chemical moiety through the carbon atom.

"Alkanediyl" refers to a diradical of a saturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of three carbon atoms. In certain embodiments, the alkanediyl is $C_{2-14}$ alkanediyl, $C_{2-10}$ alkanediyl, $C_{2-8}$ alkanediyl, $C_{2-6}$ alkanediyl, $C_{2-4}$ alkanediyl, and in certain embodiments, $C_{2-3}$ alkanediyl. Examples of alkanediyl groups include methane-diyl (—$CH_2$—), ethane-1,2-diyl (—$CH_2CH_2$—), propane-1,3-diyl and iso-propane-1,2-diyl (e.g., —$CH_2CH_2CH_2$— and —$CH(CH_3)CH_2$—), butane-1,4-diyl (—$CH_2CH_2CH_2CH_2$—), pentane-1,5-diyl (—$CH_2CH_2CH_2CH_2CH_2$—), hexane-1,6-diyl (—$CH_2CH_2CH_2CH_2CH_2CH_2$—), heptane-1,7-diyl, octane-1,8-diyl, nonane-1,9-diyl, decane-1,10-diyl, dodecane-1,12-diyl, and the like.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. In certain embodiments, each cycloalkyl and/or cycloalkanediyl group(s) is $C_{3-6}$, $C_{5-6}$, and in certain embodiments, cyclohexyl or cyclohexanediyl. In certain embodiments, each alkyl and/or alkanediyl group(s) is $C_{1-6}$, $C_{1-4}$, $C_{1-3}$, and in certain embodiments, methyl, methanediyl, ethyl, or ethane-1,2-diyl. In certain embodiments, the alkanecycloalkane group is $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, and in certain embodiments, $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. In certain embodiments, the alkanecycloalkanediyl group is $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, and in certain embodiments, $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkanearene" refers to a hydrocarbon group having one or more aryl and/or arenediyl groups and one or more alkyl and/or alkanediyl groups, where aryl, arenediyl, alkyl, and alkanediyl are defined here. In certain embodiments, each aryl and/or arenediyl group(s) is $C_{6-12}$, $C_{6-10}$, and in certain embodiments, phenyl or benzenediyl. In certain embodiments, each alkyl and/or alkanediyl group(s) is $C_{1-6}$, $C_{1-4}$, $C_{1-3}$, and in certain embodiments, methyl, methanediyl, ethyl, or ethane-1,2-diyl. In certain embodiments, the alkanearene group is $C_{4-18}$ alkanearene, $C_{4-16}$ alkanearene, $C_{4-12}$ alkanearene, $C_{4-8}$ alkanearene, $C_{6-12}$ alkanearene, $C_{6-10}$ alkanearene, and in certain embodiments, $C_{6-9}$ alkanearene. Examples of alkanearene groups include diphenyl methane.

"Alkanearenediyl" refers to a diradical of an alkanearene group. In certain embodiments, the alkanearenediyl group is $C_{4-18}$ alkanearenediyl, $C_{4-16}$ alkanearenediyl, $C_{4-12}$ alkanearenediyl, $C_{4-8}$ alkanearenediyl, $C_{6-12}$ alkanearenediyl, $C_{6-10}$ alkanearenediyl, and in certain embodiments, $C_{6-9}$ alkanearenediyl. Examples of alkanearenediyl groups include diphenyl methane-4,4'-diyl.

"Alkenyl" group refers to a group $(R)_2C=C(R)_2$. In certain embodiments, an alkenyl group has the structure —RC=$C(R)_2$ where the alkenyl group is a terminal group and is bonded to a larger molecule. In such embodiments, each R may be selected from, for example, hydrogen and $C_{1-3}$ alkyl. In certain embodiments, each R is hydrogen and an alkenyl group has the structure —CH=$CH_2$.

"Alkoxy" refers to a —OR group where R is alkyl as defined herein. Examples of alkoxy groups include methoxy, ethoxy, n-propoxy, isopropoxy, and n-butoxy. In certain embodiments, the alkoxy group is $C_{1-8}$ alkoxy, $C_{1-6}$ alkoxy, $C_{1-4}$ alkoxy, and in certain embodiments, $C_{1-3}$ alkoxy.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. In certain embodiments, the alkyl group is $C_{2-6}$ alkyl, $C_{2-4}$ alkyl, and in certain embodiments, $C_{2-3}$ alkyl. Examples of alkyl groups include methyl, ethyl, n-propyl, iso-propyl, n-butyl, iso-butyl, tert-butyl, n-hexyl, n-decyl, tetradecyl, and the like. In certain embodiments, the alkyl group is $C_{2-6}$ alkyl, $C_{2-4}$ alkyl, and in certain embodiments, $C_{2-3}$ alkyl. It will be appreciated that a branched alkyl has at least three carbon atoms.

"Arenediyl" refers to diradical monocyclic or polycyclic aromatic group. Examples of arenediyl groups include benzene-diyl and naphthalene-diyl. In certain embodiments, the arenediyl group is $C_{6-12}$ arenediyl, $C_{6-10}$ arenediyl, $C_{6-9}$ arenediyl, and in certain embodiments, benzene-diyl.

"Cycloalkanediyl" refers to a diradical saturated monocyclic or polycyclic hydrocarbon group. In certain embodiments, the cycloalkanediyl group is $C_{3-12}$ cycloalkanediyl, $C_{3-8}$ cycloalkanediyl, $C_{3-6}$ cycloalkanediyl, and in certain embodiments, $C_{5-6}$ cycloalkanediyl. Examples of cycloalkanediyl groups include cyclohexane-1,4-diyl, cyclohexane-1,3-diyl, and cyclohexane-1,2-diyl.

"Cycloalkyl" refers to a saturated monocyclic or polycyclic hydrocarbon monoradical group. In certain embodiments, the cycloalkyl group is $C_{3-12}$ cycloalkyl, $C_{3-8}$ cycloalkyl, $C_{3-6}$ cycloalkyl, and in certain embodiments, $C_{5-6}$ cycloalkyl.

"Heteroalkanediyl" refers to an alkanediyl group in which one or more of the carbon atoms are replaced with a heteroatom, such as N, O, S, or P. In certain embodiments of heteroalkanediyl, the heteroatom is selected from N and O.

"Heterocycloalkanediyl" refers to a cycloalkanediyl group in which one or more of the carbon atoms are replaced with a heteroatom, such as N, O, S, or P. In certain embodiments of heterocycloalkanediyl, the heteroatom is selected from N and O.

"Heteroarenediyl" refers to an arenediyl group in which one or more of the carbon atoms are replaced with a heteroatom, such as N, O, S, or P. In certain embodiments of heteroarenediyl, the heteroatom is selected from N and O.

"Heterocycloalkanediyl" refers to a cycloalkanediyl group in which one or more of the carbon atoms are replaced with a heteroatom, such as N, O, S, or P. In certain embodiments of heterocycloalkanediyl, the heteroatom is selected from N and O.

A "Michael acceptor" refers to an activated alkene, such as an alkenyl group proximate to an electron-withdrawing group such as an ketone, nitro, halo, nitrile, carbonyl, or nitro group. Michael acceptors are well known in the art. A "Michael acceptor group" refers to an activated alkenyl group and an electron-withdrawing group. In certain embodiments, a Michael acceptor group is selected from a vinyl ketone, a vinyl sulfone, a quinone, an enamine, a ketimine, oxazolidine, and an acrylate. Other examples of Michael acceptors are disclosed in Mather et al., *Prog. Polym. Sci.* 2006, 31, 487-531, and include acrylate esters, acrylonitrile, acrylamides, maleimides, alkyl methacrylates, cyanoacrylates. Other Michael acceptors include vinyl ketones, α,β-unsaturated aldehydes, vinyl phosphonates, acrylonitrile, vinyl pyridines, certain azo compounds, β-keto acetylenes and acetylene esters. In certain embodiments, a Michael acceptor group is derived from a vinyl sulfone and has the structure of Formula (2):

—S(O)$_2$—C(R)=CH$_2$ (2)

where each R is independently selected from hydrogen, fluorine, and $C_{1-3}$ alkyl. In certain embodiments, each R is hydrogen. In certain embodiments, a Michael acceptor or Michael acceptor group does not encompass acrylates. A "Michael acceptor compound" refers to a compound comprising at least one Michael acceptor. In certain embodiments, a Michael acceptor compound is divinyl sulfone, and a Michael acceptor group is vinylsulfonyl (—S(O)$_2$—CH=CH$_2$).

As used herein, "polymer" refers to oligomers, homopolymers, and copolymers. Unless stated otherwise, molecular weights are number average molecular weights for polymeric materials indicated as "Mn" as determined, for example, by gel permeation chromatography using a polystyrene standard in an art-recognized manner "Substituted" refers to a group in which one or more hydrogen atoms are each independently replaced with the same or different substituent(s). In certain embodiments, the substituent is selected from halogen, —S(O)$_2$OH, —S(O)$_2$, —SH, —SR where R is $C_{1-6}$ alkyl, —COOH, —NO$_2$, —NR$_2$ where each R is independently selected from hydrogen and $C_{1-3}$ alkyl, —CN, =O, $C_{1-6}$ alkyl, —CF$_3$, —OH, phenyl, $C_{2-6}$ heteroalkyl, $C_{5-6}$ heteroaryl, $C_{1-6}$ alkoxy, and —COR where R is $C_{1-6}$ alkyl. In certain embodiments, the substituent is chosen from —OH, —NH$_2$, and $C_{1-3}$ alkyl.

Compositions

Michael addition curing chemistries are often used in acrylate-based polymer systems and, as disclosed in U.S. Pat. No. 3,138,573, have been adapted for use in polysulfide compositions. Application of Michael addition curing chemistries to sulfur-containing polymers not only results in cured sealants with faster cure rates and enhanced performance including fuel resistance and thermal resistance, but also provides a sealant with improved physical properties, such as elongation. The application of Michael addition chemistries to sulfur-containing polymers useful for aerospace sealant applications is disclosed in U.S. application Ser. No. 13/529.237, filed on Jun. 21, 2012. As a further improvement to such compositions it is desirable to extend the pot life and to control the curing rate. These and other properties can be achieved by using a controlled release amine catalyst. Accordingly, compositions provided by the present disclosure comprise (a) a compound comprising at least two terminal groups reactive with Michael acceptor groups; (b) a compound having at least two Michael acceptor groups; and (c) a controlled release amine catalyst, wherein at least one of (a) and (b) comprises a polythioether polymer.

Systems in which a controlled release amine catalyst is released by photolytic, hydrolytic, thermal, or ultrasonic mechanisms are disclosed. Upon release of the amine catalyst by any one of the mechanisms, the catalytic amine catalyzes the Michael addition reaction between a compound terminated with groups reactive with Michael acceptor groups, such as terminal thiol groups, and a compound having at least two Michael acceptor groups. The compound having at least two terminal groups reactive with Michael acceptor groups may be a small molecule such as a molecule having a molecular weight less than 400 Dalton, a sulfur-containing polymer such as a polythioether, or a combination thereof. The compound having at least two Michael acceptor groups may be a small molecule and/or may be a Michael acceptor adduct. One suitable Michael acceptor adduct comprises a sulfur-containing compound such as a polythioether that is terminated with Michael acceptor groups. In certain embodiments, at least one of the compound terminated with groups reactive with Michael acceptor groups and the compound having at least two Michael acceptor groups comprises a polythioether.

Michael addition chemistries may be employed in a variety of ways to provide curable compositions. For example, a curable composition provided by the present disclosure may comprise (a) a sulfur-containing compound and a Michael acceptor curing agent; (b) a sulfur-containing Michael acceptor adduct and a curing agent comprising at least two terminal groups that are reactive with Michael acceptor groups; or (c) a sulfur-containing compound and a curing agent comprising a combination of a monomeric Michael acceptor and a sulfur-containing Michael acceptor adduct.

Sulfur-Containing Adducts

Sulfur-containing adducts provided by the present disclosure comprise terminal Michael acceptor groups. Sulfur-containing adducts useful herein include, for example, polythioethers. Examples of suitable polythioethers are disclosed in U.S. Pat. No. 6,123,179. In certain embodiments, a sulfur-containing adduct may be difunctional, and in certain embodiments, may have a functionality greater than 2 such as 3, 4, 5, or 6. A sulfur-containing adduct may comprise a mixture of sulfur-containing adducts having different functionalities characterized by an average functionality from 2.05 to 6, from 2.1 to 4, from 2.1 to 3, from 2.2 to 2.8, and in certain embodiments, from 2.4 to 2.6. Sulfur-containing adducts have at least two terminal Michael acceptor groups, and in certain embodiments have two Michael acceptor groups, 3, 4, 5, or 6 Michael acceptor groups. A sulfur-containing adduct may comprise a combination of adducts having different numbers of terminal Michael acceptor groups characterized, for example, by an average Michael acceptor functionality of from 2.05 to 6, from 2.1 to 4, from 2.1 to 3, from 2.2 to 2.8, and in certain embodiments, from 2.4 to 2.6.

In certain embodiments, a sulfur-containing adduct comprises a polythioether adduct characterized by a polythioether having at least two terminal Michael acceptor groups.

In certain embodiments, a sulfur-containing adduct comprises a polythioether adduct comprising:

(a) a backbone comprising the structure of Formula (1):

$$-R^1-[-S-(CH_2)_2-O-[-R^2-O-]_m-(CH_2)_2-S-R^1-]_n- \quad (1)$$

where (i) each $R^1$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a heterocyclic group, a $-[(-CHR^3-)_p-X-]_q-(CHR^3)_r-$ group, wherein each $R^3$ is independently selected from hydrogen and methyl; (ii) each $R^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a heterocyclic group, and a $-[(-CH_2-)_p-X-]_q-(CH_2)_r-$ group; (iii) each X is independently selected from O, S, and a $-NR^6-$ group, in which $R^6$ is selected from H and a methyl group; (iv) m ranges from 0 to 50; (v) n is an integer ranging from 1 to 60; (vi) p is an integer ranging from 2 to 6; (vii) q is an integer ranging from 1 to 5; and (viii) r is an integer ranging from 2 to 10; and (b) at least two terminal Michael acceptor groups.

In certain embodiments of a compound of Formula (1), $R^1$ is $-[-(CHR^3)_s-X-]_q-(CHR^3)_r-$ wherein each X is independently selected from $-O-$ and $-S-$. In certain embodiments wherein $R^1$ is $-[-(CHR^3)_s-X-]_q-(CHR^3)_r-$, each X is $-O-$ and in certain embodiments, each X is $-S-$.

In certain embodiments of a compound of Formula (1), $R^1$ is $-[-(CH_2)_s-X-]_q-(CH_2)_r-$ wherein each X is independently selected from $-O-$ and $-S-$. In certain embodiments wherein $R^1$ is $-[-(CH_2)_s-X-]_q-(CH_2)_r-$, each X is $-O-$ and in certain embodiments, each X is $-S-$.

In certain embodiments, $R^1$ in Formula (3a) is $-[-(CH_2-)_p-X-]_q-(CH_2)_r-$, where p is 2, X is O, q is 2, r is 2, $R^2$ is ethanediyl, m is 2, and n is 9.

Michael acceptor groups are well known in the art. In certain embodiments, a Michael acceptor group comprises an activated alkene, such as an alkenyl group proximate to an electron-withdrawing group such as an enone, nitro, halo, nitrile, carbonyl, or nitro group. In certain embodiments, a Michael acceptor group is selected from a vinyl ketone, a vinyl sulfone, a quinone, an enamine, a ketimine, an aldimine, and an oxazolidine. In certain embodiments, each of the Michael acceptor groups may be the same and in certain embodiments, at least some of the Michael acceptor groups are different.

In certain embodiments, a Michael acceptor group is derived from a vinyl sulfone and has the structure of Formula (2):

$$-CH_2-C(R^4)_2-S(O)_2-C(R^4)=CH_2 \quad (2)$$

wherein each $R^4$ is independently selected from hydrogen and $C_{1-3}$ alkyl. In certain embodiments of Formula (2), each $R^4$ is hydrogen.

In certain embodiments where the sulfur-containing adduct comprises a polythioether adduct, the polythioether adduct is selected from a polythioether adduct of Formula (3), a polythioether adduct of Formula (3a), and a combination thereof:

$$R^6-S-R^1-[-S-(CH_2)_p-O-(R^2-O)_m-(CH_2)_2-S-R^1-]_n-S-R^6 \quad (3)$$

$$\{R^6-S-R^1-[-S-(CH_2)_p-O-(R^2-O)_m-(CH_2)_2-S-R^1-]_n-S-V'-\}_zB \quad (3a)$$

wherein:
each $R^1$ independently is selected from $C_{2-10}$ alkanediyl, $C_{6-8}$ cycloalkanediyl, $C_{6-10}$ alkanecycloalkanediyl, $C_{5-8}$ heterocycloalkanediyl, and $-[(-CHR^3-)_s-X-]_q-(-CHR^3-)_r-$, wherein:
s is an integer from 2 to 6;
q is an integer from 1 to 5;
r is an integer from 2 to 10;
each $R^3$ is independently selected from hydrogen and methyl; and
each X is independently selected from $-O-$, $-S-$, and $-NR-$, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and $-[(-CHR^3-)_s-X-]_q-(-CHR^3-)_r-$, wherein s, q, r, $R^3$, and X are as defined for $R^1$;
m is an integer from 0 to 50;
n is an integer from 1 to 60;
p is an integer from 2 to 6;
B represents a core of a z-valent, vinyl-terminated polyfunctionalizing agent $B(-V)_z$ wherein:
z is an integer from 3 to 6; and
each V is a group comprising a terminal vinyl group; and
each $-V'-$ is derived from the reaction of $-V$ with a thiol; and
each $R^6$ is independently a moiety comprising a terminal Michael acceptor group.

In certain embodiments of Formula (3) and in Formula (3a), $R^1$ is $-[(-CH_2-)_p-X-]_q-(CH_2)_r-$, where p is 2, X is $-O-$, q is 2, r is 2, $R^2$ is ethanediyl, m is 2, and n is 9.

In certain embodiments of Formula (3) and Formula (3a), $R^1$ is selected from $C_{2-6}$ alkanediyl and $-[-(CHR^3)_s-X-]_q-(CHR^3)_r-$.

In certain embodiments of Formula (3) and Formula (3a), $R^1$ is $-[-(CHR^3)_s-X-]_q-(CHR^3)_r-$, and in certain embodiments X is $-O-$ and in certain embodiments, X is $-S-$.

In certain embodiments of Formula (3) and Formula (3a), where $R^1$ is $-[-(CHR^3)_s-X-]_q-(CHR^3)_r-$, p is 2, r is 2, q is 1, and X is $-S-$; in certain embodiments, wherein p is 2, q is 2, r is 2, and X is $-O-$; and in certain embodiments, p is 2, r is 2, q is 1, and X is $-O-$.

In certain embodiments of Formula (3) and Formula (3a), where $R^1$ is -[—$(CHR^3)_s$—X—$]_q$—$(CHR^3)_r$—, each $R^3$ is hydrogen, and in certain embodiments, at least one $R^3$ is methyl.

In certain embodiment of adducts of Formula (3) and Formula (3a), each $R^1$ is the same, and in certain embodiments, at least one $R^1$ is different.

In certain embodiments of adducts of Formula (3) and Formula (3a), each $R^6$ is independently selected from a vinyl ketone, a vinyl sulfone, a quinone, an enamine, a ketimine, an aldimine, and an oxazolidine. In certain embodiments, each of the Michael acceptor groups may be the same and in certain embodiments, at least some of the Michael acceptor groups are different.

In certain embodiments of adducts of Formula (3) and Formula (3a), each $R^6$ is independently derived from a vinyl sulfone and has the structure of Formula (2):

—$CH_2$—$C(R^4)_2$—$S(O)_2$—$C(R^4)$=$CH_2$ (2)

where each $R^4$ is independently selected from hydrogen and $C_{1-3}$ alkyl. In certain embodiments of compounds of Formula (3) and Formula (3a) where each $R^6$ is a moiety of Formula (2), each $R^4$ is hydrogen.

In certain embodiments, a sulfur-containing adduct comprises a polythioether adduct comprising at least two terminal Michael acceptor groups.

In certain embodiments, sulfur-containing Michael acceptor adducts provided by the present disclosure comprise the reaction products of reactants comprising: (a) a sulfur-containing polymer; and (b) a compound having a Michael acceptor group and a group that is reactive with a terminal group of the sulfur-containing polymer.

In certain embodiments, the sulfur-containing polymer comprises a polythioether. A sulfur-containing polymer may comprise a mixture of different polythioethers and the polythioethers may have the same or different functionality. In certain embodiments, a sulfur-containing polymer has an average functionality from 2 to 6, from 2 to 4, from 2 to 3, and in certain embodiments, from 2.05 to 2.5. For example, a sulfur-containing polymer can be selected from a difunctional sulfur-containing polymer, a trifunctional sulfur-containing polymer, and a combination thereof.

In certain embodiments, a sulfur-containing polymer is terminated with a group that is reactive with the terminal reactive group of the compound (b). In certain embodiments, the compound having a Michael acceptor group has two Michael acceptor groups, and the terminal groups of the sulfur-containing polymer are reactive with Michael acceptor groups such as a thiol group. A sulfur-containing polymer may comprise terminal thiol groups, terminal alkenyl groups, or terminal epoxy groups.

In certain embodiments, a sulfur-containing polymer is thiol-terminated. Examples of thiol-functional polythioethers are disclosed, for example in U.S. Pat. No. 6,172,179. In certain embodiments, a thiol-functional polythioether polymer comprises Permapol® P3.1E, available from PRC-DeSoto International Inc., Sylmar, Calif.

In certain embodiments, a sulfur-containing polymer comprises a polythioether comprising:

(a) a backbone comprising the structure of Formula (1):

—$R^1$—[—S—$(CH_2)_2$—O—[—$R^2$—O—$]_m$—$(CH_2)_2$—S—$R^1]_n$— (1)

wherein:

(i) each $R^1$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a heterocyclic group, a -[(—$CHR^3$—)$_p$—X—$]_q$—$(CHR^3)_r$— group, wherein each $R^3$ is selected from hydrogen and methyl;

(ii) each $R^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a heterocyclic group, and a -[(—$CH_2$—)$_p$—X—$]_q$—$(CH_2)_r$— group;

(iii) each X is independently selected from O, S, and a —$NR^6$— group, in which $R^6$ is selected from H and a methyl group;

(iv) m ranges from 0 to 50;

(v) n is an integer ranging from 1 to 60;

(vi) p is an integer ranging from 2 to 6;

(vii) q is an integer ranging from 1 to 5; and (viii) r is an integer ranging from 2 to 10.

In certain embodiments, a sulfur-containing polymer comprises a polythioether polymer selected from a polythioether polymer of Formula (4), a polythioether of Formula (4a), and a combination thereof:

HS—$R^1$—[—S—$(CH_2)_p$—O—$(R^2$—O$)_m$—$(CH_2)_2$—S—$R^1$—$]_n$—SH (4)

{HS—$R^1$—[—S—$(CH_2)_p$—O—$(R^2$—O$)_m(CH_2)_2$—S—$R^1$—$]_n$—S—V'—$\}_z$B (4a)

wherein:

each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and -[(—$CHR^3$—)$_s$—X—$]_q$—(—$CHR^3$—)$_r$—, wherein:

s is an integer from 2 to 6;

q is an integer from 1 to 5;

r is an integer from 2 to 10;

each $R^3$ is independently selected from hydrogen and methyl; and each X is independently selected from —O—, —S—, and —NHR—, wherein R is selected from hydrogen and methyl;

each $R^2$ is independently selected from $C_{1-10}$ alkanediyl, $C_{6-8}$ cycloalkanediyl, $C_{6-14}$ alkanecycloalkanediyl, and -[(—$CHR^3$—)$_s$—X—$]_q$—(—$CHR^3$—)$_r$—, wherein s, q, r, $R^3$, and X are as defined as for $R^1$;

m is an integer from 0 to 50;

n is an integer from 1 to 60;

p is an integer from 2 to 6;

B represents a core of a z-valent, vinyl-terminated polyfunctionalizing agent B(—V)$_z$ wherein:

z is an integer from 3 to 6; and each V is a group comprising a terminal vinyl group; and each —V'— is derived from the reaction of —V with a thiol.

In certain embodiments, Formula (4) and in Formula (4a), $R^1$ is -[(—$CH_2$—)$_p$—X—$]_q$—$(CH_2)_r$—, where p is 2, X is —O—, q is 2, r is 2, $R^2$ is ethanediyl, m is 2, and n is 9.

In certain embodiments of Formula (4) and Formula (4a), $R^1$ is selected from $C_{2-6}$ alkanediyl and -[—$(CHR^3)_s$—X—$]_q$—$(CHR^3)_r$—.

In certain embodiments of Formula (4) and Formula (4a), $R^1$ is -[—$(CHR^3)_s$—X—$]_q(CHR^3)_r$—, and in certain embodiments X is —O— and in certain embodiments, X is —S—.

In certain embodiments of Formula (4) and Formula (4a), where $R^1$ is -[—$(CHR^3)_s$—X—$]_q$—$(CHR^3)_r$—, p is 2, r is 2, q is 1, and X is —S—; in certain embodiments, wherein p is 2, q is 2, r is 2, and X is —O—; and in certain embodiments, p is 2, r is 2, q is 1, and X is —O—.

In certain embodiments of Formula (4) and Formula (4a), where $R^1$ is -[—$(CHR^3)_s$—X—]$_q$—$(CHR^3)_r$—, each $R^3$ is hydrogen, and in certain embodiments, at least one $R^3$ is methyl.

In certain embodiments of Formula (4) and Formula (4a), each $R^1$ is the same, and in certain embodiments, at least one $R^1$ is different.

Various methods can be used to prepare such polythioether polymers. Examples of suitable thiol-functional polythioether polymers, and methods for their production, are described in U.S. Pat. No. 6,172,179 at col. 2, line 29 to col. 4, line 22; col. 6, line 39 to col. 10, line 50; and col. 11, lines 65 to col. 12, line 22, the cited portions of which are incorporated herein by reference. Such thiol-functional polythioethers may be difunctional, that is, linear polymers having two thiol terminal groups, or polyfunctional, that is, branched polymers have three or more thiol terminal groups. Suitable thiol-functional polythioethers are commercially available, for example, as Permapol® P3.1E, from PRC-DeSoto International Inc., Sylmar, Calif.

Suitable thiol-functional polythioethers may be produced by reacting a divinyl ether or mixtures of divinyl ethers with an excess of dithiol or a mixtures of dithiols. For example, dithiols suitable for use in preparing thiol-functional polythioethers include those having Formula (5), other dithiols disclosed herein, or combinations of any of the dithiols disclosed herein.

In certain embodiments, a dithiol has the structure of Formula (5):

HS—$R^1$—SH    (5)

wherein:
$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and -[—$(CHR^3)_s$—X—]$_q$—$(CHR^3)_r$—;
wherein:
each $R^3$ is independently selected from hydrogen and methyl;
each X is independently selected from —O—, —S—, and —NR— wherein R is selected from hydrogen and methyl;
s is an integer from 2 to 6;
q is an integer from 1 to 5; and
r is an integer from 2 to 10.

In certain embodiments of a dithiol of Formula (5), $R^1$ is -[—$(CHR^3)_s$—X—]$_q$—$(CHR^3)_r$—.

In certain embodiments of a compound of Formula (5), X is selected from —O— and —S—, and thus -[—$(CHR^3)_s$—X—]$_q$—$(CHR^3)_r$— in Formula (5) is -[(—$CHR^3$—)$_p$—O—]$_q$—$(CHR^3)_r$— or -[(—$CHR^3{}_2$—)$_p$—S—]$_q$—$(CHR^3)_r$—. In certain embodiments, p and r are equal, such as where p and r are both two.

In certain embodiments of a dithiol of Formula (5), $R^1$ is selected from $C_{2-6}$ alkanediyl and -[—$(CHR^3)_s$—X—]$_q$—$(CHR^3)_r$—.

In certain embodiments, $R^1$ is -[—$(CHR^3)_s$—X—]$_q$—$(CHR^3)_r$—, and in certain embodiments X is —O—, and in certain embodiments, X is —S—.

In certain embodiments where $R^1$ is -[—$(CHR^3)_s$—X—]$_q$—$(CHR^3)_r$—, p is 2, r is 2, q is 1, and X is —S—; in certain embodiments, wherein p is 2, q is 2, r is 2, and X is —O—; and in certain embodiments, p is 2, r is 2, q is 1, and X is —O—.

In certain embodiments where $R^1$ is -[—$(CHR^3)_s$—X—]$_q$—$(CHR^3)_r$—, each $R^3$ is hydrogen, and in certain embodiments, at least one $R^3$ is methyl.

Examples of suitable dithiols include, for example, 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing. A polythiol may have one or more pendant groups selected from a lower (e.g., $C_{1-6}$) alkyl group, a lower alkoxy group, and a hydroxyl group. Suitable alkyl pendant groups include, for example, $C_{1-6}$ linear alkyl, $C_{3-6}$ branched alkyl, cyclopentyl, and cyclohexyl.

Other examples of suitable dithiols include dimercaptodiethylsulfide (DMDS) (in Formula (5), $R^1$ is -[(—$CH_2$—)$_p$—X—]$_q$—$(CH_2)_r$—, wherein p is 2, r is 2, q is 1, and X is —S—); dimercaptodioxaoctane (DMDO) (in Formula (5), $R^1$ is -[(—$CH_2$—)$_p$—X—]$_q$—$(CH_2)_r$—, wherein p is 2, q is 2, r is 2, and X is —O—); and 1,5-dimercapto-3-oxapentane (in Formula (5), $R^1$ is -[(—$CH_2$—)$_p$—X—]$_q$—$(CH_2)_r$—, wherein p is 2, r is 2, q is 1, and X is —O—). It is also possible to use dithiols that include both heteroatoms in the carbon backbone and pendant alkyl groups, such as methyl groups. Such compounds include, for example, methyl-substituted DMDS, such as HS—$CH_2CH(CH_3)$—S—$CH_2CH_2$—SH, HS—$CH(CH_3)CH_2$—S—$CH_2CH_2$—SH and dimethyl substituted DMDS, such as HS—$CH_2CH(CH_3)$—S—$CHCH_3CH_2$—SH and HS—$CH(CH_3)CH_2$—S—$CH_2CH(CH_3)$—SH.

Suitable divinyl ethers for preparing polythioethers and polythioether adducts include, for example, divinyl ethers of Formula (6):

$CH_2$=CH—O—$(R^2$—O—$)_m$—CH=$CH_2$    (6)

where $R^2$ in Formula (6) is selected from a $C_{2-6}$ n-alkanediyl group, a $C_{3-6}$ branched alkanediyl group, a $C_{6-8}$ cycloalkanediyl group, a $C_{6-10}$ alkanecycloalkanediyl group, and -[(—$CH_2$—)$_p$—O—]$_q$—(—$CH_2$—)$_r$—, where p is an integer ranging from 2 to 6, q is an integer from 1 to 5, and r is an integer from 2 to 10. In certain embodiments of a divinyl ether of Formula (6), $R^2$ is a $C_{2-6}$ n-alkanediyl group, a $C_{3-6}$ branched alkanediyl group, a $C_{6-8}$ cycloalkanediyl group, a $C_{6-10}$ alkanecycloalkanediyl group, and in certain embodiments, -[(—$CH_2$—)$_p$—O—]$_q$—(—$CH_2$—)$_r$—.

Suitable divinyl ethers include, for example, compounds having at least one oxyalkanediyl group, such as from 1 to 4 oxyalkanediyl groups, i.e., compounds in which m in Formula (6) is an integer ranging from 1 to 4. In certain embodiments, m in Formula (6) is an integer ranging from 2 to 4. It is also possible to employ commercially available divinyl ether mixtures that are characterized by a non-integral average value for the number of oxyalkanediyl units per molecule. Thus, m in Formula (6) can also take on rational number values ranging from 0 to 10.0, such as from 1.0 to 10.0, from 1.0 to 4.0, or from 2.0 to 4.0.

Examples of suitable divinyl ethers include, for example, divinyl ether, ethylene glycol divinyl ether (EG-DVE) ($R^2$ in Formula (6) is ethanediyl and m is 1), butanediol divinyl ether (BD-DVE) ($R^2$ in Formula (6) is butanediyl and m is 1), hexanediol divinyl ether (HD-DVE) ($R^2$ in Formula (6) is hexanediyl and m is 1), diethylene glycol divinyl ether (DEG-DVE) ($R^2$ in Formula (4) is ethanediyl and m is 2), triethylene glycol divinyl ether ($R^2$ in Formula (14) is ethanediyl and m is 3), tetraethylene glycol divinyl ether ($R^2$ in Formula (6) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers. A polyvinyl ether may have one or more pendant groups selected from alkyl groups, hydroxyl groups, alkoxy groups, and amine groups.

In certain embodiments, divinyl ethers in which $R^2$ in Formula (6) is $C_{3-6}$ branched alkanediyl may be prepared by reacting a polyhydroxy compound with acetylene. Examples of divinyl ethers of this type include compounds in which $R^2$ in Formula (6) is an alkyl-substituted methanediyl group such as —CH(CH$_3$) (for example Pluriol® blends such as Pluriol® E-200 divinyl ether (BASF Corp., Parsippany, N.J.), for which $R^2$ in Formula (6) is ethanediyl and m is 3.8) or an alkyl-substituted ethanediyl (for example —CH$_2$CH (CH$_3$)— such as DPE polymeric blends including DPE-2 and DPE-3, International Specialty Products, Wayne, N.J.).

Other useful divinyl ethers include compounds in which $R^2$ in Formula (6) is polytetrahydrofuryl (poly-THF) or polyoxyalkanediyl, such as those having an average of about 3 monomer units.

Two or more types of polyvinyl ether monomers of Formula (6) may be used. Thus, in certain embodiments, two dithiols of Formula (5) and one polyvinyl ether monomer of Formula (6), one dithiol of Formula (5) and two polyvinyl ether monomers of Formula (6), two dithiols of Formula (5) and two divinyl ether monomers of Formula (6), and more than two compounds of one or both Formula (5) and Formula (6), may be used to produce a variety of thiol-functional polythioethers.

In certain embodiments, a polyvinyl ether monomer comprises 20 to less than 50 mole percent of the reactants used to prepare a thiol-functional polythioether, and in certain embodiments, 30 to less than 50 mole percent.

In certain embodiments provided by the present disclosure, relative amounts of dithiols and divinyl ethers are selected to yield polythioethers having terminal thiol groups. Thus, a dithiol of Formula (5) or a mixture of at least two different dithiols of Formula (5), are reacted with of a divinyl ether of Formula (6) or a mixture of at least two different divinyl ethers of Formula (6) in relative amounts such that the molar ratio of thiol groups to vinyl groups is greater than 1:1, such as 1.1 to 2.0:1.0.

The reaction between compounds of dithiols and divinyl ethers may be catalyzed by a free radical catalyst. Suitable free radical catalysts include, for example, azo compounds, for example azobisnitriles such as azo(bis)isobutyronitrile (AIBN); organic peroxides such as benzoyl peroxide and t-butyl peroxide; and inorganic peroxides such as hydrogen peroxide. The catalyst may be a free-radical catalyst, an ionic catalyst, or ultraviolet radiation. In certain embodiments, the catalyst does not comprise acidic or basic compounds, and does not produce acidic or basic compounds upon decomposition. Examples of free-radical catalysts include azo-type catalyst, such as Vazo®-57 (Du Pont), Vazo®-64 (Du Pont), Vazo®-67 (Du Pont), V-70® (Wako Specialty Chemicals), and V-65B® (Wako Specialty Chemicals). Examples of other free-radical catalysts are alkyl peroxides, such as t-butyl peroxide. The reaction may also be effected by irradiation with ultraviolet light either with or without a cationic photoinitiating moiety.

Thiol-functional polythioethers provided by the present disclosure may be prepared by combining at least one compound of Formula (5) and at least one compound of Formula (6) followed by addition of an appropriate catalyst, and carrying out the reaction at a temperature from 30° C. to 120° C., such as 70° C. to 90° C., for a time from 2 to 24 hours, such as 2 to 6 hours.

As disclosed herein, thiol-terminated polythioethers may comprise a polyfunctional polythioether, i.e., may have an average functionality of greater than 2.0. Suitable polyfunctional thiol-terminated polythioethers include, for example, those having the structure of Formula (7):

$$B(\text{-A-SH})_z \qquad (7)$$

wherein: (i) A comprises, for example, a structure of Formula (1), (ii) B denotes a z-valent residue of a polyfunctionalizing agent; and (iii) z has an average value of greater than 2.0, and, in certain embodiments, a value between 2 and 3, a value between 2 and 4, a value between 3 and 6, and in certain embodiments, is an integer from 3 to 6.

Polyfunctionalizing agents suitable for use in preparing such polyfunctional thiol-functional compounds include trifunctionalizing agents, that is, compounds where z is 3. Suitable trifunctionalizing agents include, for example, triallyl cyanurate (TAC), 1,2,3-propanetrithiol, isocyanurate-containing trithiols, and combinations thereof, as disclosed in U.S. Publication No. 2010/0010133 at paragraphs [0102]-[0105], the cited portion of which is incorporated herein by reference. Other useful polyfunctionalizing agents include trimethylolpropane trivinyl ether, and the polythiols described in U.S. Pat. Nos. 4,366,307; 4,609,762; and 5,225,472. Mixtures of polyfunctionalizing agents may also be used.

As a result, thiol-functional polythioethers suitable for use in embodiments provided by the present disclosure may have a wide range of average functionality. For example, trifunctionalizing agents may afford average functionalities from 2.05 to 3.0, such as from 2.1 to 2.6. Wider ranges of average functionality may be achieved by using tetrafunctional or higher functionality polyfunctionalizing agents. Functionality may also be affected by factors such as stoichiometry, as will be understood by those skilled in the art.

Thiol-functional polythioethers having a functionality greater than 2.0 may be prepared in a manner similar to the difunctional thiol-functional polythioethers described in U.S. Publication No. 2010/0010133. In certain embodiments, polythioethers may be prepared by combining (i) one or more dithiols described herein, with (ii) one or more divinyl ethers described herein, and (iii) one or more polyfunctionalizing agents. The mixture may then be reacted, optionally in the presence of a suitable catalyst, to afford a thiol-functional polythioether having a functionality greater than 2.0.

Thus, in certain embodiments, a thiol-terminated polythioether comprises the reaction product of reactants comprising:

(a) a dithiol of Formula (5):

$$\text{HS}-R^1-\text{SH} \qquad (5)$$

wherein:

$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and ;

wherein:

each $R^3$ is independently selected from hydrogen and methyl;

each X is independently selected from —O—, —S—, —NH—, and —NR— wherein R is selected from hydrogen and methyl;

s is an integer from 2 to 6;

q is an integer from 1 to 5; and r is an integer from 2 to 10; and (b) a divinyl ether of Formula (6):

$$CH_2=CH-O-[-R^2-O-]_m-CH=CH_2 \quad (6)$$

wherein:
each $R^2$ is independently selected from $C_{1-10}$ alkanediyl, $C_{6-8}$ cycloalkanediyl, $C_{6-14}$ alkanecycloalkanediyl, and -[(—$CHR^3$—)$_s$—X—]$_q$—(—$CHR^3$—)$_r$—, wherein s, q, r, $R^3$, and X are as defined above;
m is an integer from 0 to 50;
n is an integer from 1 to 60; and
p is an integer from 2 to 6.

And, in certain embodiments, the reactants comprise (c) a polyfunctional compound such as a polyfunctional compound B(—V)$_z$, where B, —V, and z are as defined herein.

Thiol-terminated polythioethers provided by the present disclosure represent thiol-terminated polythioethers having a molecular weight distribution. In certain embodiments, useful thiol-terminated polythioethers can exhibit a number average molecular weight ranging from 500 Daltons to 20,000 Daltons, in certain embodiments, from 2,000 Daltons to 5,000 Daltons, and in certain embodiments, from 3,000 Daltons to 4,000 Daltons. In certain embodiments, useful thiol-terminated polythioethers exhibit a polydispersity ($M_w/M_n$; weight average molecular weight/number average molecular weight) ranging from 1 to 20, and in certain embodiments, from 1 to 5. The molecular weight distribution of thiol-terminated polythioethers may be characterized by gel permeation chromatography.

In certain embodiments, polythioethers provided by the present disclosure are essentially free, or free, of sulfone, ester and/or disulfide linkages. As used herein, "essentially free of sulfone, ester, and/or disulfide linkages" means that less than 2 mole percent of the linkages in the polythioether are sulfone, ester, and/or disulfide linkages. As a result, in certain embodiments, the resulting polythioethers are also essentially free, or free, of sulfone, ester, and/or disulfide linkages.

To prepare a sulfur-containing Michael acceptor adduct, a sulfur-containing polymer such as those disclosed herein may be reacted with (b) a compound having a group that is reactive with the terminal groups of the sulfur-containing polymer and a Michael acceptor group.

In certain embodiments, a Michael acceptor group is selected from a vinyl ketone, a vinyl sulfone, a quinone, an enamine, a ketimine, an aldimine, and an oxazolidine. In certain embodiments, a Michael acceptor group is a vinyl ketone, and in certain embodiments, a vinyl sulfone such as divinyl sulfone. In embodiments in which the compound having a Michael acceptor group is divinyl sulfone, the sulfur-containing polymer may be thiol-terminated such as a thiol-terminated polythioether polymer.

The reaction between a sulfur-containing polymer and a compound having a Michael acceptor group and a group that is reactive with a terminal group of the sulfur-containing polymer can be performed in the presence of an appropriate catalyst.

Compositions

Michael addition chemistries may be employed in a variety of ways to provide curable compositions. For example, a curable composition provided by the present disclosure may comprise (a) a sulfur-containing compound and a Michael acceptor curing agent; (b) a sulfur-containing Michael acceptor adduct and a curing agent comprising at least two terminal groups that are reactive with Michael acceptor groups; or (c) a sulfur-containing compound and a curing agent comprising a combination of a monomeric Michael acceptor and a sulfur-containing Michael acceptor adduct. In certain compositions, the sulfur-containing compound comprises a polythioether polymer, in certain embodiments the Michael acceptor adduct comprises a polythioether polymer, and in certain embodiments, both the sulfur-containing compound and the Michael acceptor adduct comprise a polythioether polymer.

Sulfur-Containing Polymer and Michael Acceptor Curing Agent

In certain embodiments, compositions provided by the present disclosure comprise a sulfur-containing polymer and a Michael acceptor curing agent. A sulfur-containing polymer may be a polythioether or combination of polythioethers having terminal groups reactive with the Michael acceptor. In certain embodiments, a sulfur-containing polymer is thiol-terminated. In such embodiments, a Michael acceptor will be polyfunctional and have Michael acceptor groups reactive with the terminal groups of the sulfur-containing polymer.

In certain embodiments, a sulfur-containing polymer comprises a thiol-terminated polythioether, including any of the thiol-terminated polythioethers disclosed herein, such as a thiol-terminated polythioether of Formula (1). In certain embodiments, a sulfur-containing polymer comprises a thiol-terminated polythioether, such as a thiol-terminated polythioether of Formula (4), Formula (4a), or a combination thereof. In certain embodiments, a sulfur-containing polymer is selected from a difunctional sulfur-containing polymer, a trifunctional-containing polymer and a combination of thereof. In certain embodiments, a thiol-terminated polymer comprises a mixture of sulfur-containing polymers having an average functionality from 2 to 3, and in certain embodiments, from 2.2 to 2.8. In certain embodiments, a thiol-terminated polythioether comprises Permapol® 3.1E, available from PRC-DeSoto International.

A polyfunctional Michael acceptor has at least two Michael acceptor groups. A polyfunctional Michael acceptor may have an average Michael acceptor functionality from 2 to 6, from 2 to 4, from 2 to 3, and in certain embodiments, from 2.05 to 2.5. In certain embodiments, a polyfunctional Michael acceptor is difunctional, such as, divinyl ketone and divinyl sulfone. A Michael acceptor having a functionality greater than two may be prepared by reacting a compound having a Michael acceptor group and a group reactive with terminal groups of a polyfunctionalizing agent such as those disclosed herein, using appropriate reaction conditions.

In certain embodiments where a Michael acceptor is used as a curing agent, the molecular weight of the Michael acceptor is less than 600 Daltons, less than 400 Daltons, and in certain embodiments, less than 200 Daltons.

In certain embodiments, a Michael acceptor comprises from about 0.5 wt % to about 20 wt % of the composition, from about 1 wt % to about 10 wt %, from about 2 wt % to about 8 wt %, from about 2 wt % to about 6 wt %, and in certain embodiments, from about 3 wt % to about 5 wt %, where wt % is based on the total dry solids weight of the composition.

Sulfur-Containing Michael Acceptor Adduct and a Curing Agent

In certain embodiments, a composition comprises a sulfur-containing Michael acceptor adduct provided by the present disclosure and a sulfur-containing compound curing agent.

In such compositions a sulfur-containing adduct comprises any of those disclosed herein. In certain embodiments, a sulfur-containing adduct comprises a polyethioether adduct, and in certain embodiments a polythioether adduct has an average functionality from 2 to 3, from 2.2 to 2.8, and in certain embodiments, from 2.4 to 2.6. In certain embodiments, a sulfur-containing adduct has an average functionality of 2.

In certain embodiments, a sulfur-containing Michael acceptor adduct comprises a compound of Formula (3), Formula (3a), or a combination thereof, and the sulfur-containing compound curing agent comprises a polythioether of Formula (4), Formula (4a), or a combination thereof. In certain embodiments, the sulfur-containing adduct comprises the Michael acceptor adduct of Permapol® 3.1E. In certain embodiments, the sulfur-containing compound curing agent comprises Permapol® 3.1E.

In certain embodiments, a sulfur-containing Michael acceptor adduct comprises a compound of Formula (3), Formula (3a), or a combination thereof, and the sulfur-containing compound curing agent comprises a polythioether. In certain embodiments, the sulfur-containing Michael acceptor adduct comprises the Michael acceptor adduct of Permapol® 3.1E. In certain embodiments, the sulfur-containing compound comprises a polythioether of Formula (4), Formula (4a), or a combination thereof.

In such compositions the Michael acceptor groups of the adduct are reactive with the terminal groups of the sulfur-containing compound. For example, the Michael acceptor groups may be activated alkenyl groups, e.g., Michael acceptor groups, and the sulfur-containing compound comprises terminal thiol groups.

A sulfur-containing compound used as a curing agent comprises at least two terminal groups reactive with Michael acceptor groups. A sulfur-containing compound used as a curing agent in such compositions may comprise a polythioether including any of those disclosed herein. The sulfur-containing compound may have an average functionality of about 2 or any functionality from about 2 and about 6, such as from about 2 to about 4, or from about 2 to about 3.

A sulfur-containing compounds used as a curing agent may be a small molecule such as compound having a molecular weight less than 400 Daltons, a polymer, or a combination thereof. For example, a sulfur-containing compound may be a dithiol of Formula (5) such as, for example, DMDO a polythiol of Formula (7), or a combination of any of the foregoing.

In certain embodiments, the sulfur-containing compound curing agent comprises a thiol-terminated polythioether such as, for example, Permapol® 3.1E.

In such embodiments, when used as a curing agent, a sulfur-containing compound, comprises from about 20 wt % to about 90 wt % of the composition, from about 30 wt % to about 80 wt %, from about 40 wt % to about 60 wt %, and in certain embodiments, about 50 wt %, where wt % is based on the total dry weight of the composition.

In such embodiments, a sulfur-containing Michael acceptor adduct comprises from about 20 wt % to about 90 wt % of the composition, from about 30 wt % to about 80 wt %, from about 40 wt % to about 60 wt %, and in certain embodiments, about 50 wt %, where wt % is based on the total dry weight of the composition.

In certain embodiments, a composition comprises a polythioether adduct and a curing agent. A polythioether adduct includes any of those disclosed herein, such as polythioether adducts of Formula (3), Formula (3a), and combinations thereof.

In certain embodiments of such compositions, the composition comprises a sulfur-containing Michael acceptor adduct provided by the present disclosure and a curing agent selected from a sulfur-containing compound comprising at least two terminal groups reactive with Michael acceptor groups, a monomeric thiol, a polythiol, a polyamine, a blocked polyamine, and a combination of any of the foregoing. In certain embodiments, a curing agent comprises a sulfur-containing compound comprising at least two terminal groups reactive with Michael acceptor groups; in certain embodiments a monomeric thiol; in certain embodiments a polythiol; in certain embodiments a polyamine; and in certain embodiments, a blocked polyamine. In certain embodiments of such compositions, a curing agent comprises a sulfur-containing compound comprising at least two terminal groups reactive with Michael acceptor groups and a compound having at least two terminal groups reactive with Michael acceptor groups selected from a monomeric thiol, a polythiol, a polyamine, a blocked polyamine, and a combination of any of the foregoing.

In certain embodiments, a sulfur-containing compound comprising at least two terminal groups reactive with Michael acceptor groups is selected from a polythioether compound comprising at least two terminal groups reactive with Michael acceptor groups. In certain embodiments, the terminal groups reactive with Michael acceptor groups are terminal thiol groups. In such embodiments, a thiol-terminated polythioether may be selected from a polythioether of Formula (4), a polythioether of Formula (4a), and a combination thereof.

In certain compositions, the curing agent comprises a monomeric thiol. A monomeric thiol refers to a compound having at least two terminal thiol groups. Examples of monomeric thiols include dithiols of Formula (5) and/or polythiols of Formula (7). Polythiols refer to higher molecular weight compounds having terminal thiol groups and thiol groups in the backbone.

Sulfur-Containing Adduct, Sulfur-Containing Compound, and a Compound having at Least Two Michael Acceptor Groups In certain embodiments, a composition comprises a sulfur-containing compound, and a sulfur-containing Michael acceptor adduct. In certain embodiments, a composition comprises a sulfur-containing compound, a polyfunctional Michael acceptor, and a sulfur-containing Michael acceptor adduct.

In such compositions, a sulfur-containing compound comprises at least two terminal groups reactive with Michael acceptor groups. In such compositions, the sulfur-containing compound may be selected from a polythioether compound, including a suitable polythioether compound provided by the present disclosure.

In certain embodiments, a sulfur-containing compound is selected such that the terminal groups are reactive with the polyfunctional Michael acceptor and the sulfur-containing Michael acceptor adduct. In certain embodiments, a sulfur-containing compound comprises terminal thiol groups including any of the thiol-terminated polythioethers disclosed herein.

In certain embodiments of such compositions, a sulfur-containing adduct comprises a polythioether adduct provided by the present disclosure.

When a composition comprises a polyfunctional monomeric Michael acceptor, any suitable monomeric Michael acceptor having at least two Michael acceptor groups such as, for example, divinyl sulfone or other Michael acceptors including any of those disclosed herein may be used.

In certain embodiments, a sulfur-containing compound is selected from a polythioether of Formula (3), Formula (3a), and a combination thereof; a polyfunctional Michael acceptor adduct is selected from an adduct of Formula (4), Formula (4a), and a combination thereof; and a polyfunctional monomeric Michael acceptor is selected from a compound having two or more activated alkenyl groups such as a vinyl ketone or a vinyl sulfone, such as divinyl sulfone.

In certain embodiments, at least one of the sulfur-containing compound and the Michael acceptor adduct comprise a polythioether.

In such embodiments, the polyfunctional Michael acceptor and Michael acceptor adduct comprise 10 wt % to 90 wt % of the composition, from 20 wt % to 80 wt %, from 30 wt % to 70 wt %, and in certain embodiments, from 40 wt % to 60 wt %, where wt % is based on the total dry solids weight of the composition.

Compositions comprising a sulfur-containing compound, a polyfunctional Michael acceptor, and a sulfur-containing adduct comprise a controlled release catalyst including any of those disclosed herein.

Epoxy Blend

In certain embodiments, compositions provided by the present disclosure comprise an epoxy curing agent. Thus, in addition to a Michael acceptor curing agent, a sulfur-containing curing agent, and/or a sulfur-containing Michael acceptor adduct curing agent, a composition may comprise one or more polyepoxy curing agents. Examples of suitable epoxies include, for example, polyepoxide resins such as hydantoin diepoxide, diglycidyl ether of bisphenol-A, diglycidyl ether of bisphenol-F, Novolac® type epoxies such as DEN™ 438 (available from Dow), certain epoxidized unsaturated resins, and combinations of any of the foregoing. A polyepoxide refers to a compound having two or more reactive epoxy groups.

In certain embodiments, a polyepoxy curing agent comprises an epoxy-functional compound. Examples of suitable epoxy-functional compounds include the epoxy-functional polyformal compounds disclosed in U.S. patent application Ser. No. 13/050,988 and epoxy-functional polythioether compounds disclosed in U.S. Pat. No. 7,671,145. In general, when used as a curing agent, an epoxy-functional compound has a molecular weight less than about 2,000 Daltons, less than about 1,500, Daltons, less than about 1,000 Daltons, and in certain embodiments, less than about 500 Daltons.

In such compositions, an epoxy may comprise about 0.5 wt % to about 20 wt % of the composition, from about 1 wt % to about 10 wt %, from about 2 wt % to about 8 wt %, from about 2 wt % to about 6 wt %, and in certain embodiments, from about 3 wt % to about 5 wt %, where wt % is based on the total solids weight of the composition.

Controlled Release Amine Catalyst

Controlled release amine catalysts have little or no activity until released, either chemically or physically. In certain embodiments, a controlled release amine catalyst may be released upon exposure to ultraviolet radiation, heat, ultrasonication, or moisture.

In the case of controlled release amine catalysts that are released by ultraviolet radiation or moisture, the amine catalyst comprises a blocking group that reacts upon exposure to the ultraviolet radiation or moisture to release or unblock a reactive amine catalyst. In matrix encapsulant systems, the amine catalyst is trapped among side chains of a crystalline or semi-crystalline polymer. At elevated temperature, the polymer melts allowing the amine catalyst to diffuse into the composition to catalyze the reaction.

In certain embodiments, a controlled release amine catalyst comprises a controlled release amine catalyst. In certain embodiment, a controlled release amine catalyst may be a controlled release primary amine catalyst, a controlled release secondary amine catalyst, or a controlled release tertiary amine catalyst. Examples of suitable primary amine catalysts include, for example, $C_{3-10}$ aliphatic primary amines, such as heptane amine, hexylamine, and octamine. Examples of suitable secondary amine catalysts include, for example, cycloaliphatic diamines such as Jefflink® 754 and aliphatic diamines such as Clearlink® 1000. Examples of suitable tertiary amine catalysts include, for example, N,N-dimethylethanolamine (DMEA), diaminobicyclooctane (DABCO), triethylene diamine (TEDA), bis(2-dimethylaminoethyl)ether (BDMAEE), N-ethylmorpholine, N'N'-dimethylpiperazine, N,N,N',N',N''-pentamethyl-diethylene-triamine (PMDETA), N,N'-dimethylcyclohexylamine (DMCHA), N,N-dimethylbenzylamine (DMBA), N,N-dimethylcethylamine, N,N,N',N'',N''-pentamethyl-dipropylene-triamine (PMDPTA), triethylamine, and 1-(2-hydroxypropyl) imidazole. Other suitable amine catalysts include amidine catalysts such as tetramethyguanidine (TMG), dizabicyclononene (DBN), diazabicyclo undecene (DBU) and imidazoles; and bicyclic guanidines such as 1,5,7,-triazabicyclo[4.4.0]dec-5-ene (TBD) and 1,5,7,-triazabicyclo[4.4.0]dec-5-ene, 7-methyl (MTBD).

In certain embodiments, an amine catalyst is selected from DBU, DABCO, IPDA, a $C_{6-10}$ primary amine, and a combination of any of the foregoing.

Compositions may comprise one or more different types of amine catalyst.

When released, controlled release amine catalysts provided by the present disclosure catalyze the reaction between a compound containing at least two terminal groups that are reactive with Michael acceptor groups and a compound comprising at least two Michael acceptor groups.

In controlled release compositions provided by the present disclosure, the pot life of a composition can be greater than 2 weeks if the catalyst is not released. When the catalyst is released, either by chemical, photochemical, or physical mechanisms, the cure time can be less than 72 hours, less than 60 hours, less than 48 hours, less than 36 hours, and in certain embodiments less than 24 hours. The cure time without heating and in the presence of ambient moisture, can be several days such as, for example, 7 days.

Photolabile Controlled Release Amine Catalyst

Certain compositions provided by the present disclosure comprise a photolabile catalyst. In such systems, UV radiation unblocks a blocked amine catalyst, which catalyzes the Michael addition reaction between a compound comprising at least two terminal groups that are reactive with Michael acceptor groups and a compound comprising at least two Michael acceptor groups. In certain embodiments, the UV radiation initiates the reaction, which takes place over time, such as for example several hours. The slow curing can be useful to improve surface adhesion and to extend the pot life to provide a longer working time.

Photolabile amines comprise a photolabile moiety bonded to an amine.

In certain embodiments, a photolabile catalyst comprises CGI 90 (BASF), which following UV activation, generates the tertiary amine, 1,5-diazabicyclo(4.3.0)non-5-ene (DBN). Other suitable photolabile amines are disclosed in International Publication No. WO 2003/033500 and in the documents cited therein.

In compositions comprising a photolabile amine catalyst, the photolabile amine catalyst may comprise from 0.1 wt % to 5 wt % of the composition, from 0.3 wt % to 2 wt % of the composition, and in certain embodiments, from 0.5 wt % of the composition to 1 wt % of the composition.

Moisture-Release Amine Catalyst

In certain embodiments, a controlled release amine catalyst comprises a moisture-released blocked amine catalyst. In such systems, the blocked amine catalyst can be unblocked in the presence of moisture to release an amine catalyst capable of catalyzing a Michael addition reaction. Examples of moisture-release blocked amine catalysts include ketimines, enamines, oxazolidines, aldimines, and imidazolidines. In the presence of moisture, the blocking group, e.g., the ketamine, enamine, oxazolidine, aldimine, or imidazolidine blocking group or groups reacts with water to provide a catalytic amine catalyst and a ketone or alcohol.

In certain embodiments, a composition comprising a moisture-released amine catalyst comprises from 0.1 wt % to 2 wt % water, from 0.2 wt % to 1.5 wt % water, and in certain embodiments, from 0.5 wt % to 1 wt % water. The composition is stored a low temperature, such as at a temperature less than 0° C., less than −20° C., or in certain embodiments, less than −40 C. When the composition is heated before and/or during application, the water unblocks the blocked amine to catalyze the Michael addition reaction.

In certain embodiments, a moisture-released blocked amine catalyst releases a primary amine, a secondary amine, and in certain embodiments a tertiary amine. In certain embodiments, a moisture-released blocked amine catalyst is Vestamin® A139, which is a blocked cycloaliphatic diamine In certain embodiments, the unblocked amine is isophorone diamine (IPDA).

In compositions comprising a moisture-released amine catalyst, the moisture released amine catalyst may comprise from 0.1 wt % to 4 wt % of the composition, from 0.5 wt % to 3 wt % of the composition, and in certain embodiments, from 1 wt % of the composition to 2 wt % of the composition.

In certain embodiments, the ratio (wt %/wt %) of wt % water to moisture-released amine catalyst (wt %) in compositions provided by the present disclosure can be from 1 to 4, from 1 to 2, and in certain embodiment, from 1 to 1.

Compositions comprising a moisture-released blocked amine catalyst may, in addition to being stored a low temperature, may be stored such as to prevent exposure to ambient moisture.

Matrix Encapsulation

Matrix encapsulation is a process by which droplets or particles of liquid or solid material are trapped among side chains of a crystalline polymer. With increased temperature, the crystalline polymer becomes amorphous and releases the droplets or particles into the medium. Matrix encapsulants provided by the present disclosure comprise a crystalline matrix material incorporating droplets or particles comprising an amine catalyst. Thus, the rate of reaction is to some extent controlled by thermally dependent diffusion of the amine catalyst from the crystalline polymer. The crystalline polymers may have a sharp well-defined melting point or may exhibit a melting point range. The use of waxy polymers for encapsulation of amine catalysts used in Michael addition compositions is disclosed in U.S. Application Publication no. 2007/0173602.

Examples of suitable matrix encapsulants include Intelimer® polymers (Air Products), such as Intelimer® 13-1 and Intelimer® 13-6. The properties of Intelimer® polymers is disclosed in Lowry et al., Cure evaluation of Intelimer latent curing agents for thermoset resin applications, presented at the Thermoset Resin Formulators Association Meeting, Chicago, Ill., Sep. 15-16, 2008.

A matrix encapsulant may be selected to release the amine catalyst following a brief high-temperature exposure such as for less than 10 minutes, less than 5 minutes, or less than 2 minutes. During this brief temperature excursion, amine catalyst is released from the matrix and diffuses into the reactive polymer components. The composition may be heated during the curing process or may be left at ambient temperature. When left at ambient temperature, the released amine catalyst composition may cure in less than 2 hours, in less than 4 hours, and in certain embodiments, in less than 6 hours.

Amine catalysts may be incorporated into a matrix encapsulant by blending at a temperature above the melt temperature of the matrix encapsulant, rapidly cooling the mixture, and grinding the solid to a powder. In certain embodiments, the average particle size is less than 200 µm, less than 150 µm, less than 100 µm, less than 50 µm, and in certain embodiments, less than 25 µm.

In certain embodiments, a composition may comprise from 0.1 wt % to 25 wt %, from 1 wt % to 15 wt %, and in certain embodiments, from 5 wt % to10 wt % of a matrix encapsulant comprising an amine catalyst. This correlates to about 0.01 wt % to 2 wt %, from 0.05 wt % to 1.5 wt %, and in certain embodiments, from 0.5 wt % to 1 wt % of an amine catalyst.

In certain embodiments, a matrix encapsulant suitable for use in compositions provided by the present disclosure comprises a ratio (wt %/wt %) of wt % amine catalyst to wt % matrix polymer from 1 to 15, from 2 to 10, and in certain embodiments, from 5 to 8.

Properties

For aerospace sealant applications it is desirable that a sealant meet the requirements of Mil-S-22473E (Sealant Grade C) at a cured thickness of 20 mils, exhibit an elongation greater than 200%, a tensile strength greater than 250 psi , and excellent fuel resistance, and maintain these properties over a wide temperature range from −67° F. to 360° F. In general, the visual appearance of the sealant is not an important attribute. Prior to cure, it is desirable that the mixed components have a useful working time or pot life of at least 24 hours and have a cure time within 24 hours of the pot life. Useful working time or pot life refers to the time period the composition remains workable for application at ambient temperatures after the catalyst is released. In certain embodiments, compositions provided by the present disclosure, following release of the catalytic amine, have a pot life of at least 6 hours, at least 12 hours, at least 18 hours, at least 24 hours, and in certain embodiments, more than 24 hours. In certain embodiments, compositions provided by the present disclosure cure in less than 6 hours after the pot life, in less than 12 hours, in less than 18 hours, in less than 24 hours, in less than 48 hours, and in certain embodiments, in less than 72 hours after useful working time.

Formulations

Compositions provided by the present disclosure may comprise one or more additional components suitable for use in aerospace sealants and depend at least in part on the desired performance characteristics of the cured sealant under conditions of use.

In certain embodiments, compositions provided by the present disclosure comprise one or more than one adhesion promoters. A one or more additional adhesion promoter may be present in amount from 0.1 wt % to 15 wt % of a composition, less than 5 wt %, less than 2 wt %, and in certain embodiments, less than 1 wt %, based on the total dry weight of the composition. Examples of adhesion promoters include phenolics, such as Methylon® phenolic resin, and organosilanes, such as epoxy, mercapto or amino functional silanes, such as Silquest® A-187 and Silquest® A-1100. Other useful adhesion promoters are known in the art.

Compositions provided by the present disclosure may comprise one or more different types of filler. Suitable fillers include those commonly known in the art, including inorganic fillers, such as carbon black and calcium carbonate ($CaCO_3$), silica, polymer powders, and lightweight fillers. Suitable lightweight fillers include, for example, those described in U.S. Pat. No. 6,525,168. In certain embodiments, a composition includes 5 wt % to 60 wt % of the filler or combination of fillers, 10 wt % to 50 wt %, and in certain embodiments, from 20 wt % to 40 wt %, based on the total dry weight of the composition. Compositions provided by the present disclosure may further include one or more colorants, thixotropic agents, accelerators, fire retardants, adhesion promoters, solvents, masking agents, or a combination of any of the foregoing. As can be appreciated, fillers and additives employed in a composition may be selected so as to be compatible with each other as well as the polymeric component, curing agent, and or catalyst.

In certain embodiments, compositions provided by the present disclosure include low density filler particles. As used herein, low density, when used with reference to such particles means that the particles have a specific gravity of no more than 0.7, in certain embodiments no more than 0.25, and in certain embodiments, no more than 0.1. Suitable lightweight filler particles often fall within two categories—microspheres and amorphous particles. The specific gravity of microspheres may range from 0.1 to 0.7 and include, for example, polystyrene foam, microspheres of polyacrylates and polyolefins, and silica microspheres having particle sizes ranging from 5 to 100 microns and a specific gravity of 0.25 (Eccospheres®). Other examples include alumina/silica microspheres having particle sizes in the range of 5 to 300 microns and a specific gravity of 0.7 (Finite), aluminum silicate microspheres having a specific gravity of from about 0.45 to about 0.7 (Z-Light®), calcium carbonate-coated polyvinylidene copolymer microspheres having a specific gravity of 0.13 (Dualite® 6001AE), and calcium carbonate coated acrylonitrile copolymer microspheres such as Dualite® E135, having an average particle size of about 40 μm and a density of 0.135 g/cc (Henkel). Suitable fillers for decreasing the specific gravity of the composition include, for example, hollow microspheres such as Expancel® microspheres (available from AkzoNobel) or Dualite® low density polymer microspheres (available from Henkel). In certain embodiments, compositions provided by the present disclosure include lightweight filler particles comprising an exterior surface coated with a thin coating, such as those described in U.S. Publication No. 2010/0041839 at paragraphs [0016]-[0052], the cited portion of which is incorporated herein by reference.

In certain embodiments, a low density filler comprises less than 2 wt % of a composition, less than 1.5 wt %, less than 1.0 wt %, less than 0.8 wt %, less than 0.75 wt % less than 0.7 wt % and in certain embodiments, less than 0.5 wt % of a composition, where wt % is based on the total dry solids weight of the composition.

In certain embodiments, compositions provided by the present disclosure comprise at least one filler that is effective in reducing the specific gravity of the composition. In certain embodiments, the specific gravity of a composition is from 0.8 to 1, 0.7 to 0.9, from 0.75 to 0.85, and in certain embodiments, is 0.8. In certain embodiments, the specific gravity of a composition is less than about 0.9, less than about 0.8, less than about 0.75, less than about 0.7, less than about 0.65, less than about 0.6, and in certain embodiments, less than about 0.55.

In certain embodiments, compositions provided by the present disclosure comprise an electrically conductive filler. Electrical conductivity and EMI/RFI shielding effectiveness can be imparted to composition by incorporating conductive materials within the polymer. The conductive elements can include, for example, metal or metal-plated particles, fabrics, meshes, fibers, and combinations thereof. The metal can be in the form of, for example, filaments, particles, flakes, or spheres. Examples of metals include copper, nickel, silver, aluminum, tin, and steel. Other conductive materials that can be used to impart EMI/RFI shielding effectiveness to polymer compositions include conductive particles or fibers comprising carbon or graphite. Conductive polymers such as polythiophenes, polypyrroles, polyaniline, poly(p-phenylene) vinylene, polyphenylene sulfide, polyphenylene, and polyacetylene can also be used.

Examples of electrically non-conductive fillers include materials such as, but not limited to, calcium carbonate, mica, polyamide, fumed silica, molecular sieve powder, microspheres, titanium dioxide, chalks, alkaline blacks, cellulose, zinc sulfide, heavy spar, alkaline earth oxides, alkaline earth hydroxides, and the like. Fillers also include high band gap materials such as zinc sulfide and inorganic barium compounds. In certain embodiments, an electrically conductive base composition can comprise an amount of electrically non-conductive filler ranging from 2 wt % to 10 wt % based on the total weight of the base composition, and in certain embodiments, can range from 3 wt % to 7 wt %. In certain embodiments, a curing agent composition can comprise an amount of electrically non-conductive filler ranging from less than 6 wt % and in certain embodiments ranging from 0.5% to 4% by weight, based on the total weight of the curing agent composition.

Fillers used to impart electrical conductivity and EMI/RFI shielding effectiveness to polymer compositions are well known in the art. Examples of electrically conductive fillers include electrically conductive noble metal-based fillers such as pure silver; noble metal-plated noble metals such as silver-plated gold; noble metal-plated non-noble metals such as silver plated cooper, nickel or aluminum, for example, silver-plated aluminum core particles or platinum-plated copper particles; noble-metal plated glass, plastic or ceramics such as silver-plated glass microspheres, noble-metal plated aluminum or noble-metal plated plastic microspheres; noble-metal plated mica; and other such noble-metal conductive fillers. Non-noble metal-based materials can also be used and include, for example, non-noble metal-plated non-noble metals such as copper-coated iron particles or nickel plated copper; non-noble metals, e.g., copper, aluminum, nickel, cobalt; non-noble-metal-plated-non-metals, e.g., nickel-plated graphite and non-metal materials such as carbon black and graphite. Combinations of electrically conductive fillers can also be used to meet the desired conductivity, EMI/RFI shielding effectiveness, hardness, and other properties suitable for a particular application.

The shape and size of the electrically conductive fillers used in the compositions of the present disclosure can be any appropriate shape and size to impart EMI/RFI shielding effectiveness to the cured composition. For example, fillers can be of any shape that is generally used in the manufacture of electrically conductive fillers, including spherical, flake, platelet, particle, powder, irregular, fiber, and the like. In certain sealant compositions of the disclosure, a base composition can comprise Ni-coated graphite as a particle, powder or flake. In certain embodiments, the amount of Ni-coated graphite in a base composition can range from 40 wt % to 80 wt %, and in certain embodiments can range from 50 wt % to 70 wt %, based on the total weight of the base composition. In certain embodiments, an electrically conductive filler can comprise Ni fiber. Ni fiber can have a diameter ranging from 10 µm to 50 µm and have a length ranging from 250 µm to 750 µm. A base composition can comprise, for example, an amount of Ni fiber ranging from 2 wt % to 10 wt %, and in certain embodiments, from 4 wt % to 8 wt %, based on the total weight of the base composition.

Carbon fibers, particularly graphitized carbon fibers, can also be used to impart electrical conductivity to compositions of the present disclosure. Carbon fibers formed by vapor phase pyrolysis methods and graphitized by heat treatment and which are hollow or solid with a fiber diameter ranging from 0.1 micron to several microns, have high electrical conductivity. As disclosed in U.S. Pat. No. 6,184,280, carbon microfibers, nanotubes or carbon fibrils having an outer diameter of less than 0.1 µm to tens of nanometers can be used as electrically conductive fillers. An example of graphitized carbon fiber suitable for conductive compositions of the present disclosure include Panex® 3OMF (Zoltek Companies, Inc., St. Louis, Mo.), a 0.921 µm diameter round fiber having an electrical resistivity of 0.00055 Ω-cm.

The average particle size of an electrically conductive filler can be within a range useful for imparting electrical conductivity to a polymer-based composition. For example, in certain embodiments, the particle size of the one or more fillers can range from 0.25 µm to 250 µm, in certain embodiments can range from 0.25 µm to 75 µm, and in certain embodiments can range from 0.25 µm to 60 µm. In certain embodiments, composition of the present disclosure can comprise Ketjen Black EC-600 JD (Akzo Nobel, Inc., Chicago, Ill.), an electrically conductive carbon black characterized by an iodine absorption of 1000-11500 mg/g (J0/84-5 test method), and a pore volume of 480-510 cm$^3$/100 gm (DBP absorption, KTM 81-3504). In certain embodiments, an electrically conductive carbon black filler is Black Pearls 2000 (Cabot Corporation, Boston, Mass.).

In certain embodiments, electrically conductive polymers can be used to impart or modify the electrical conductivity of compositions of the present disclosure. Polymers having sulfur atoms incorporated into aromatic groups or adjacent to double bonds, such as in polyphenylene sulfide, and polythiophene, are known to be electrically conductive. Other electrically conductive polymers include, for example, polypyrroles, polyaniline, poly(p-phenylene)vinylene, and polyacetylene. In certain embodiments, the sulfur-containing polymers forming a base composition can be polysulfides and/or polythioethers. As such, the sulfur-containing polymers can comprise aromatic sulfur groups and sulfur atoms adjacent to conjugated double bonds such as vinylcyclohexene-dimercaptodioxaoctane groups, to enhance the electrical conductivity of the compositions of the present disclosure.

Compositions of the present disclosure can comprise more than one electrically conductive filler and the more than one electrically conductive filler can be of the same or different materials and/or shapes. For example, a sealant composition can comprise electrically conductive Ni fibers, and electrically conductive Ni-coated graphite in the form of powder, particles or flakes. The amount and type of electrically conductive filler can be selected to produce a sealant composition which, when cured, exhibits a sheet resistance (four-point resistance) of less than 0.50 Ω./cm$^2$, and in certain embodiments, a sheet resistance less than 0.15 Ω/cm$^2$. The amount and type of filler can also be selected to provide effective EMI/RFI shielding over a frequency range of from 1 MHz to 18 GHz for an aperture sealed using a sealant composition of the present disclosure.

Galvanic corrosion of dissimilar metal surfaces and the conductive compositions of the present disclosure can be minimized or prevented by adding corrosion inhibitors to the composition, and/or by selecting appropriate conductive fillers. In certain embodiments, corrosion inhibitors include strontium chromate, calcium chromate, magnesium chromate, and combinations thereof. U.S. Pat. Nos. 5,284,888 and 5,270,364 disclose the use of aromatic triazoles to inhibit corrosion of aluminum and steel surfaces. In certain embodiments, a sacrificial oxygen scavenger such as Zn can be used as a corrosion inhibitor. In certain embodiments, the corrosion inhibitor can comprise less than 10% by weight of the total weight of the electrically conductive composition. In certain embodiments, the corrosion inhibitor can comprise an amount ranging from 2% by weight to 8% by weight of the total weight of the electrically conductive composition. Corrosion between dissimilar metal surfaces can also be minimized or prevented by the selection of the type, amount, and properties of the conductive fillers comprising the composition.

In certain embodiments, a sulfur-containing compound and/or sulfur-containing adduct comprises from about 50 wt % to about 90 wt % of a composition, from about 60 wt % to about 90 wt %, from about 70 wt % to about 90 wt %, and in certain embodiments, from about 80 wt % to about 90 wt % of the composition, where wt % is based on the total dry solids weight of the composition.

Uses

Compositions provided by the present disclosure may be used, for example, in sealants, coatings, encapsulants, and potting compositions. A sealant includes a composition capable of producing a film that has the ability to resist operational conditions, such as moisture and temperature, and at least partially block the transmission of materials, such as water, fuel, and other liquid and gases. A coating composition includes a covering that is applied to the surface of a substrate to, for example, improve the properties of the substrate such as the appearance, adhesion, wettability, corrosion resistance, wear resistance, fuel resistance, and/or abrasion resistance. A potting composition includes a material useful in an electronic assembly to provide resistance to shock and vibration and to exclude moisture and corrosive agents. In certain embodiments, sealant compositions provided by the present disclosure are useful, e.g., as aerospace sealants and as linings for fuel tanks.

In certain embodiments, compositions, such as sealants, may be provided as multi-pack compositions, such as two-pack compositions, wherein one package comprises one or more components comprising at least two terminal groups reactive with Michael acceptor groups provided by the present disclosure and a second package comprises one or more Michael acceptors provided by the present disclosure. Additives and/or other materials may be added to either package as desired or necessary. The two packages may be combined and mixed prior to use. In certain embodiments, the pot life of the combined composition is at least 12 hours, at least 24 hours, at least 48 hours, and in certain embodiments, more than 48 hours.

In two-part compositions, one or more controlled release amine catalysts may be included in either component or in both components. In certain embodiments, the controlled release catalyst may be a third component that is mixed with a polythioether and Michael acceptor components prior to use. In certain embodiments, the compositions are provided as a one-part composition. Such one-part compositions are maintained and stored under conditions such as the controlled release catalyst is not substantially released. For example, a composition comprising a photolabile catalyst may be shielded from UV radiation, a moisture release catalyst may be sealed from moisture and frozen, and a composition comprising a matrix encapsulant may be stored at temperatures below the melting temperature of the matrix encapsulant polymer.

Compositions, including sealants, provided by the present disclosure may be applied to any of a variety of substrates. Examples of substrates to which a composition may be applied include metals such as titanium, stainless steel, and aluminum, any of which may be anodized, primed, organic-coated or chromate-coated; epoxy; urethane; graphite; fiberglass composite; Kevlar®; acrylics; and polycarbonates. In certain embodiments, compositions provided by the present disclosure may be applied to a coating on a substrate, such as a polyurethane coating.

Compositions provided by the present disclosure may be applied directly onto the surface of a substrate or over an underlayer by any suitable coating process known to those of ordinary skill in the art.

Furthermore, methods are provided for sealing an aperture utilizing a composition provided by the present disclosure. These methods comprise, for example, applying a composition provided by the present disclosure to a surface to seal an aperture, and curing the composition. In certain embodiments, a method for sealing an aperture comprises (a) applying a sealant composition provided by the present disclosure to one or more surfaces defining an aperture, (b) assembling the surfaces defining the aperture, and (c) curing the sealant, to provide a sealed aperture.

In certain embodiments, a composition may be cured under ambient conditions, where ambient conditions refers to a temperature from 20° C. to 25° C., and atmospheric humidity. In certain embodiments, a composition may be cured under conditions encompassing a temperature from a 0° C. to 100° C. and humidity from 0% relative humidity to 100% relative humidity. In certain embodiments, a composition may be cured at a higher temperature such as at least 30° C., at least 40° C., and in certain embodiments, at least 50° C. In certain embodiments, a composition may be cured at room temperature, e.g., 25° C. In certain embodiments, a composition may be cured upon exposure to actinic radiation, such as ultraviolet radiation. As will also be appreciated, the methods may be used to seal apertures on aerospace vehicles including aircraft and aerospace vehicles.

In certain embodiments, a composition achieves a tack-free cure in less than about 6 hours, in less than about 12 hours, less than about 18 hours, less than about 24 hours, and in certain embodiments, less than about 48 hours, after the useful working time of the composition.

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within 24 hours to 30 hours, and 90% of full adhesion strength develops from 2 days to 3 days, following application to a surface. In general, full adhesion strength as well as other properties of cured compositions of the present disclosure becomes fully developed within 7 days following mixing and application of a curable composition to a surface.

Cured compositions disclosed herein, such as cured sealants, exhibit properties acceptable for use in aerospace applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF for 7 days, and following immersion in a solution of 3% NaCl according to AMS 3265B test specifications; tensile strength between 300 pounds per square inch (psi) and 400 psi; tear strength greater than 50 pounds per linear inch (pli); elongation between 250% and 300%; and hardness greater than 40 Durometer A. These and other cured sealant properties appropriate for aviation and aerospace applications are disclosed in AMS 3265B, the entirety of which is incorporated herein by reference. It is also desirable that, when cured, compositions of the present disclosure used in aviation and aircraft applications exhibit a percent volume swell not greater than 25% following immersion for one week at 60° C. (140° F.) and ambient pressure in JRF type 1. Other properties, ranges, and/or thresholds may be appropriate for other sealant applications.

In certain embodiments, therefore, compositions provided by the present disclosure are fuel-resistant. As used herein, the term "fuel resistant" means that a composition, when applied to a substrate and cured, can provide a cured product, such as a sealant, that exhibits a percent volume swell of not greater than 40%, in some cases not greater than 25%, in some cases not greater than 20%, in yet other cases not more than 10%, after immersion for one week at 140° F. (60° C.) and ambient pressure in Jet Reference Fluid (JRF) Type I according to methods similar to those described in ASTM D792 (American Society for Testing and Materials) or AMS 3269 (Aerospace Material Specification). Jet Reference Fluid JRF Type I, as employed for determination of fuel resistance, has the following composition: toluene: 28±1% by volume; cyclohexane (technical): 34±1% by volume; isooctane: 38±1% by volume; and tertiary dibutyl disulfide: 1±0.005% by volume (see AMS 2629, issued Jul. 1, 1989, §3.1.1 etc., available from SAE (Society of Automotive Engineers)).

In certain embodiments, compositions provided herein provide a cured product, such as a sealant, exhibiting a tensile elongation of at least 100% and a tensile strength of at least 400 psi when measured in accordance with the procedure described in AMS 3279, §3.3.17.1, test procedure AS5127/1, §7.7.

In certain embodiments, compositions provide a cured product, such as a sealant, that exhibits a lap shear strength of greater than 200 psi, such as at least 220 psi, at least 250 psi, and, in some cases, at least 400 psi, when measured according to the procedure described in SAE AS5127/1 paragraph 7.8.

In certain embodiments, a cured sealant comprising a composition provided by the present disclosure meets or exceeds the requirements for aerospace sealants as set forth in AMS 3277.

Apertures, including apertures of aerospace vehicles, sealed with compositions provided by the present disclosure are also disclosed.

In certain embodiments, an electrically conductive sealant composition provided by the present disclosure exhibits the following properties measured at room temperature following exposure at 500° F. for 24 hours: a surface resistivity of less than 1 ohms/square, a tensile strength greater than 200 psi, an elongation greater than 100%, and a cohesive failure of 100% measured according to MIL-C-27725.

In certain embodiments, a cured sealant provided by the present disclosure exhibits the following properties when cured for 2 days at room temperature, 1 day at 140° F., and 1 day at 200° F.: a dry hardness of 49, a tensile strength of 428 psi, and an elongation of 266%; and after 7 days in JRF, a hardness of 36, a tensile strength of 312 psi, and an elongation of 247%.

In certain embodiments, compositions provided by the present disclosure exhibit a Shore A hardness (7-day cure) greater than 10, greater than 20, greater than 30, and in certain embodiments, greater than 40; a tensile strength greater than 10 psi, greater than 100 psi, greater than 200 psi, and in certain embodiments, greater than 500 psi; an elongation greater than 100%, greater than 200%, greater than 500%, and in certain embodiments, greater than 1,000%; and a swell following exposure to JRF (7 days) less than 20%.

EXAMPLES

Embodiments provided by the present disclosure are further illustrated by reference to the following examples, which describe the synthesis, properties, and uses of certain sulfur-containing compounds, Michael acceptor adducts, and compositions comprising sulfur-containing compounds, Michael acceptor adducts, Michael acceptors, and controlled release amine catalysts. It will be apparent to those skilled in the art that many modifications, both to materials, and methods, may be practiced without departing from the scope of the disclosure.

Example 1

Encapsulated Catalyst Preparation 9.3 grams of Intelimer® 13-6 (from Air Products and Chemicals, Allentown, Pa.) and 0.7 gram of isophorone diamine (3-aminomethyl-3,5,5-trimethylcyclohexylamine, Vestamin® IPD, Evonik Industries) were blended at 80° C. for 30 minutes. The mixture was rapidly cooled to room temperature and then ground to powders with an average particle size of 25 microns.

Example 2

Encapsulated Catalyst Preparation 9.0 grams of Intelimer® 13-1 (from Air Products and Chemicals, Allentown, Pa.) and 1.0 gram of isophorone diamine were blended at 80° C. for 30 minutes. The mixture was rapidly cooled to room temperature and then ground to a powder.

Example 3

Encapsulated Catalyst Preparation 9.5 grams of Intelimer® 13-1 (from Air Products and Chemicals, Allentown, Pa.) and 0.5 gram of isophorone diamine were blended at 80° C. for 30 minutes. The mixture was rapidly cooled to room temperature and then ground to a powder.

Example 4

Synthesis of Vinyl Sulfone-Capped Polythioether Adduct

In a 300 mL, 3-necked, round bottom flask fitted with a mechanical stirrer, thiol-terminated polythioether polymer Permapol® P3.1E (149.40 g, available from PRC-Desoto International, Inc., Sylmar, Calif.), divinyl sulfone (12.18 g), and triethylenediamine (0.81 g) were added at room temperature. The mixture was stirred for 10 minutes, resulting a vinyl sulfone-terminated polythioether adduct that had a viscosity of 309.0 poise. The viscosity was measured using a CAP2000 viscometer with spindle #6, 50 RPM.

Example 5

Synthesis of Polythioether Polymer

In a 2 L flask, 524.8 g (3.32 mol) of diethylene glycol divinyl ether (DEG-DVE) and 706.7 g (3.87 mol) of dimercaptodioxaoctane (DMDO) were mixed with 19.7 g (0.08 mol) of triallylcyanurate (TAC) and heated to 77° C. To the heated reaction mixture was added 4.6 g (0.024 mol) of an azoibisnitrile free radical catalyst (Vazo® 67, 2,2'-azobis(2-methylbutyronitrile), commercially available from DuPont). The reaction proceeded substantially to completion after 2 hours to afford 1,250 g (0.39 mol, yield 100%) of a liquid polythioether resin having a $T_g$ of −68° C. and a viscosity of 65 poise. The resin was faintly yellow and had low odor.

The synthesis of the polythioether and other suitable polythioethers are disclosed in U.S. Pat. No. 6,172,179.

Example 6

Heat-Triggered Release—Matrix Encapsulation

Mixing was performed in a plastic container with a lid. The polythioether adduct of Example 4 (20 g), T-5314 (32 g, a thiol-terminated intermediate comprising the polymer described in Example 5, available from PRC-Desoto International, Inc., Sylmar, Calif.), and the matrix-encapsulated catalyst (1.86 g) of Example 1 were added to the container. The container was placed in a mixer (DAC 600 FVZ) and mixed for 10 seconds at 2,300 rpm. A portion of the mixture was heated according to the heating schedule described in Table 1 and another portion of the mixture was kept at ambient conditions. The physical state of the samples is indicated in Table 1.

TABLE 1

| Example 6 Composition | |
|---|---|
| Heating Schedule | Physical State of Samples |
| No Heating | Remained liquid for 48 hours |
| 180° F./5 min | Cured in 4 hours after heating |
| 200° F./5 min | Cured in 4 hours after heating |

Example 7

Matrix Encapsulation

Mixing was performed in a plastic container with a lid. The polythioether adduct of Example 4 (20 g), T-5314 (32 g, a thiol-terminated intermediate comprising the polymer described in Example 5, available from PRC-Desoto International, Inc., Sylmar, Calif.), and the encapsulated catalyst of Example 2 (1.86 g) were added to the container. The container was placed in a mixer (DAC 600 FVZ) and the materials mixed for 10 seconds at 2,300 rpm. A portion of the mixture was heated according to the heating scheduled described in Table 2 and another portion of the mixture was maintained at ambient conditions. The physical state of the samples is indicated in Table 2.

TABLE 2

| Example 7 Composition | |
|---|---|
| Heating Schedule | Physical State of Samples |
| No Heating | Remained liquid for 24 hours |
| 160° F./5 min. | Cured in 4 hours after heating |
| 170° F./5 min. | Cured in 4 hours after heating |

Example 8

Matrix Encapsulant

Figure 1:
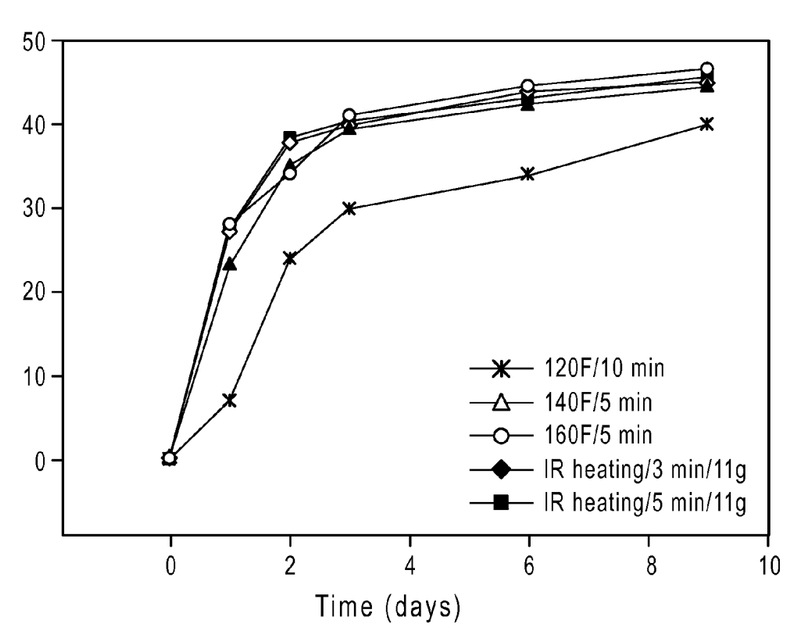
FIG. 1 is a graph showing hardness (Shore A) of a composition cured at various temperatures following thermally triggered release of an amine catalyst, isophorone diamine (IPDA), from a matrix encapsulant.

Mixing was performed in a plastic container with a lid. The polythioether adduct of Example 4 (53.79 g), Permapol® P3.1E (53.27 g, a thiol-terminated polymer described in Example 5, available from PRC-Desoto International, Inc., Sylmar, Calif.), silica (7.28 g), and Example 3 (13.45 g) were added to the container. The container was placed in a mixer (DAC 600 FVZ) and mixed for 30 seconds at 2,300 rpm. A portion of the mixed material was transferred to five separate metal cans. Each can held about 11 grams of the mixed material. Three of the five cans were heated in an oven at varying temperatures and times as shown in FIG. 1. Two of the five cans were heated by an infrared heater for 3 minutes and 5 minutes, respectively. The hardness values were measured on the material after it was exposed to heat. FIG. 1 shows the results.

A second portion of the mixed material was exposed to ambient conditions for 4 days. After 4 days, the mixed material still remained workable.

Example 9

Matrix Encapsulant—Ultrasonic Release

Mixing was performed in a plastic container with a lid. The polythioether adduct of Example 4 (11.76 g), Permapol® P3.1E (1.65 g, a thiol-terminated polymer described in Example 5, available from PRC-Desoto International, Inc., Sylmar, Calif.), Cab-O-Sil® M5 (1.46 g), and the encapsulated catalyst of Example 3 (2.69 g) were added to the container. The container was placed in a mixer (DAC 600 FVZ) and mixed for 30 seconds at 2,300 rpm. A portion of the mixed material was placed in between two pieces of aluminum plate, each plate having a dimension of 3 in.×3 in.×0.001 in. The distance between the two plates was 0.002 in. The set of aluminum plates having the mixed material between, was placed in contact with the horn of an ultrasonicator (Model 2000X, available from Emerson Industrial Automation, Danbury, Conn.) for 3 seconds at 20 KHz. After this, the mixture between two aluminum plates cured in 2 days.

A second portion of the mixed material was exposed to ambient conditions for 4 days. After 4 days, the mixed material still remained pasty.

Example 10

Photolabile Catalyst

Mixing was performed in a plastic container with a lid. The polythioether adduct of Example 4 (50.39 g), Permapol® P3.1E (46.74 g, a thiol-terminated polymer described in Example 5, available from PRC-DeSoto International, Inc., Sylmar, Calif.), and CGI 90 catalyst (1.86 g, a photo-labile amine, available from BASF) were added to the container. The container was placed in a high speed mixer (DAC 600 FVZ) and the materials mixed for 10 seconds at 2,300 rpm. A portion of the mixed material was left inside the plastic container for 4 days at room temperature. After 4 days, the mixture still remained liquid and no curing was observed.

A second portion of the mixed material was poured onto a 12 in.×18 in.×¼ in. flat glass substrate and pressed to form a uniform sheet with approximately ⅛ in. thickness. The sheet was exposed to a UV energy for 60 seconds using a Phoseon Firefly UV light available from Phoseon Technology, Hillsboro, Oreg. The sheet was cured for 7 days at ambient conditions. The cured sheet had a tensile strength of 605 psi, an elongation of 987%, and a hardness of 35 A. The tensile strength and elongation were measured according to ASTM D412, and the hardness was measured according to ASTM D 2240.

Example 11

Moisture-Release Catalyst

Mixing was performed in a plastic container with a lid. The polythioether adduct of Example 4 (16.80 g), Permapol® P3.1E (15.22 g, a thiol-terminated polymer described in Example 5, available from PRC-Desoto International, Inc., Sylmar, Calif.), and Vestamin® A 139 (0.32 g, a blocked isophorone diamine, commercially available from Evonik) were added to the container. The container was placed in a mixer (DAC 600 FVZ) and mixed for 30 seconds at 2,300 rpm. A portion of the mixed material was allowed to remain inside the plastic container (no moisture exposure) for 1 day at room temperature. After 1 day, the mixture still remained liquid and no curing was observed.

A second portion of the mixed material was exposed to ambient conditions and allowed to cure for 8 hours at ambient conditions. The mixed material cured as a solid elastomer.

Comparative Example 12

Michael Addition Using Un-Encapsulated Triethylamine as Catalyst

Mixing was performed in a plastic container with a lid. The polythioether adduct of Example 4 (8.40 g), Permapol® P3.1E (7.61 g, a thiol-terminated polymer described in Example 5, available from PRC-Desoto International, Inc., Sylmar, Calif.), and), Cab-O-Sil® M5 (0.66 g) and triethylamine (0.16 g) were added to the container. The container was placed in a mixer (DAC 600 FVZ) and mixed for 30 seconds at 2,300 rpm.

The mixed material was allowed to cure at ambient conditions. The mixed material cured as a solid elastomer in 5 weeks. However, the surface of the cured polymer was tacky.

Comparative Example 13

Michael Addition Using Un-Encapsulated IPDA as a Catalyst

Mixing was performed in a plastic container with a lid. The polythioether adduct of Example 4 (8.40 g), Permapol® P3.1E (7.61 g, a thiol-terminated polymer described in Example 5, available from PRC-Desoto International, Inc., Sylmar, Calif.), and isophorone diamine (0.16 g) were added to the container. The container was placed in a mixer (DAC 600 FVZ) and mixed for 30 seconds at 2,300 rpm.

The mixed material was allowed to cure at ambient conditions. The mixed material cured as a solid elastomer within 2 hours.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. A composition comprising:
   (a) a compound comprising at least two terminal groups reactive with Michael acceptor groups;
   (b) a compound having at least two Michael acceptor groups; and
   (c) a controlled release amine catalyst; wherein,
   the compound having at least two Michael acceptor groups comprises a polythioether adduct selected from a polythioether adduct of Formula (3), a polythioether adduct of Formula (3a), and a combination thereof:

(3)

(3a)

wherein:
   each $R^1$ independently is selected from $C_{2-10}$ alkanediyl, $C_{6-8}$ cycloalkanediyl, $C_{6-10}$ alkanecycloalkanediyl, $C_{5-8}$ heterocycloalkanediyl, and $—[(—CHR^3—)_s—X—]_q—(—CHR^3—)_r—$,
   wherein:
      s is an integer from 2 to 6;
      q is an integer from 1 to 5;
      r is an integer from 2 to 10;
      each $R^3$ is independently selected from hydrogen and methyl; and
      each X is independently selected from —O—, —S—, and —NR—,
   wherein R is selected from hydrogen and methyl;
   each $R^2$ is independently selected from $C_{1-10}$ alkanediyl, $C_{6-8}$ cycloalkanediyl, $C_{6-14}$ alkanecycloalkanediyl, and $—[(—CHR^3—)_s—X—]_q—(—CHR^3—)_r—$, wherein s, q, r, $R^3$, and X are as defined for $R^1$;
   m is an integer from 0 to 50;
   n is an integer from 1 to 60;
   p is an integer from 2 to 6;
   B represents a core of a z-valent, vinyl-terminated polyfunctionalizing agent B(—V)_z wherein:
      z is an integer from 3 to 6; and
      each V is a group comprising a terminal vinyl group; and
      each —V'— is derived from the reaction of —V with a thiol; and
   each $R^6$ is independently a moiety comprising a terminal Michael acceptor group selected from a vinyl ketone, a quinone, an enamine, a ketamine, an aldimine, and an oxazolidine.

2. The composition of claim 1, wherein the compound (a) has a molecular weight less than 400 Daltons.

3. The composition of claim 1, wherein the compound (a) comprises a polythioether polymer selected from a polythioether polymer of Formula (4), a polythioether polymer of Formula (4a), and a combination thereof:

(4)

(4a)

wherein:
   each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and $—[(—CHR^3—)_s—X—]_q—(—CHR^3—)_r—$,
   wherein:
      s is an integer from 2 to 6;
      q is an integer from 1 to 5;
      r is an integer from 2 to 10;
      each $R^3$ is independently selected from hydrogen and methyl; and
      each X is independently selected from —O—, —S—, and —NR—,
   wherein R is selected from hydrogen and methyl;
   each $R^2$ is independently selected from $C_{1-10}$ alkanediyl, $C_{6-8}$ cycloalkanediyl, $C_{6-14}$ alkanecycloalkanediyl, and $—[(—CHR^3—)_s—X—]_q—(—CHR^3—)_r—$, wherein s, q, r, $R^3$, and X are as defined as for $R^1$;
   m is an integer from 0 to 50;
   n is an integer from 1 to 60;
   p is an integer from 2 to 6;
   B represents a core of a z-valent, vinyl-terminated polyfunctionalizing agent B(—V)z wherein:
      z is an integer from 3 to 6; and
      each V is a group comprising a terminal vinyl group; and
      each —V'— is derived from the reaction of —V with a thiol.

4. The composition of claim 1, wherein the compound having at least two Michael acceptor groups has a molecular weight less than 400 Daltons.

5. The composition of claim 1, wherein the polythioether adduct comprises the reaction products of reactants comprising:
(a) a polythioether polymer; and
(b) a compound having a Michael acceptor group selected from a vinyl ketone, a quinone, an enamine, a ketamine, an aldimine, and an oxazolidine; and a group that is reactive with a terminal group of the polythioether polymer.

6. The composition of claim 5, wherein the polythioether polymer comprises a polythioether polymer selected from a polythioether polymer of Formula (4), a polythioether polymer of Formula (4a), and a combination thereof:

(4)

(4a)

wherein:
each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(-CHR^3-)_s-X-]_q-(-CHR^3-)_r-$,
wherein:
s is an integer from 2 to 6;
q is an integer from 1 to 5;
r is an integer from 2 to 10;
each $R^3$ is independently selected from hydrogen and methyl; and
each X is independently selected from —O—, —S—, and —NR—,
wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and $-[(-CHR^3-)_s-X-]_q-(-CHR^3-)_r-$, wherein s, q, r, $R^3$, and X are as defined for $R^1$;
m is an integer from 0 to 50;
n is an integer from 1 to 60;
p is an integer from 2 to 6;
B represents a core of a z-valent, vinyl-terminated polyfunctionalizing agent $B(-V)_z$ wherein:
z is an integer from 3 to 6; and
each —V is a group comprising a terminal vinyl group; and
each —V'— is derived from the reaction of —V with a thiol.

7. The composition of claim 1, comprising a polyepoxy.

8. The composition of claim 1, comprising a monomeric compound having at least two Michael acceptor groups.

9. The composition of claim 1, wherein the amine catalyst is selected from 1,8-diazabicycloundec-7-ene (DBU), 1,4-diazabicyclo [2.2.2]octane (DABCO), isophorone diamine (IPDA), and a $C_{6-10}$ primary amine, and a combination of any of the foregoing.

10. The composition of claim 1, wherein the controlled release amine catalyst comprises a blocked amine catalyst.

11. The composition of claim 10, wherein the blocked amine catalyst is capable of being unblocked by exposure to ultraviolet radiation to release a catalytic amine catalyst.

12. The composition of claim 10, wherein the blocked amine catalyst is capable of being unblocked in the presence of moisture to release a catalytic amine catalyst.

13. The composition of claim 1, wherein the controlled release amine catalyst comprises a matrix encapsulant comprising an amine catalyst.

14. The composition of claim 13, wherein the matrix encapsulant is capable of releasing the amine catalyst upon heating or ultrasonication.

15. The composition of claim 1, formulated as a sealant.

16. A sealed surface comprising a cured composition of claim 15.

17. A method of sealing a surface, comprising:
applying the composition of claim 15 to a surface; and
curing the composition to provide a sealed surface.

* * * * *